US012613519B2

(12) United States Patent
Kato et al.

(10) Patent No.: US 12,613,519 B2
(45) Date of Patent: Apr. 28, 2026

(54) POWER SYSTEM MONITORING CONTROL SYSTEM AND METHOD

(71) Applicant: HITACHI, LTD., Tokyo (JP)

(72) Inventors: Daichi Kato, Tokyo (JP); Eisuke Kuroda, Tokyo (JP); Masahiro Watanabe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 739 days.

(21) Appl. No.: 17/998,312

(22) PCT Filed: Apr. 30, 2021

(86) PCT No.: PCT/JP2021/017170
§ 371 (c)(1),
(2) Date: Nov. 9, 2022

(87) PCT Pub. No.: WO2022/004116
PCT Pub. Date: Jan. 6, 2022

(65) Prior Publication Data
US 2023/0221716 A1      Jul. 13, 2023

(30) Foreign Application Priority Data

Jul. 1, 2020    (JP) ................................ 2020-114285

(51) Int. Cl.
*G05B 23/02*            (2006.01)
(52) U.S. Cl.
CPC ...... *G05B 23/0291* (2013.01); *G05B 2223/06* (2018.08)
(58) Field of Classification Search
CPC ............ G05B 23/0291; G05B 2223/06; G06Q 10/0635; G06Q 10/20; G06Q 50/06; H02J 3/0012; H02J 13/00001; H02J 13/00002
See application file for complete search history.

(56) References Cited

U.S. PATENT DOCUMENTS

2011/0209010 A1*    8/2011   Morimura ........... G06F 11/0748
714/57
2012/0158312 A1*    6/2012   Nukatsuka ............. G06Q 10/04
702/23

(Continued)

FOREIGN PATENT DOCUMENTS

JP          2010-020434 A      1/2010
JP           2016063573 A   *  4/2016

(Continued)

OTHER PUBLICATIONS

International Search Report, mailed Jul. 20, 2021, for International Application No. PCT/JP2021/017170.

(Continued)

*Primary Examiner* — Santosh R Poudel
(74) *Attorney, Agent, or Firm* — Baker Botts L.L.P.

(57)                ABSTRACT

A power system monitoring control system and method that retains a control table and, when a failure occurs, controls a target according to a type of the failure according to the control table in which the method includes: estimating a contingency point which is an occurrence point of the failure that is assumed in the power system based on prescribed disaster information; estimating an assumed disaster content which is a content of a disaster at each contingency point based on the disaster information and an estimation result of the contingency point; changing contingency data based on an estimation result of the assumed disaster content at each contingency point, contingency data including an occurrence site and an aspect of each of the failures that are assumed to occur, and a contingency change rule including a contingency data change rule; and updating the control table based on changed contingency data.

16 Claims, 19 Drawing Sheets

(56)          References Cited

U.S. PATENT DOCUMENTS

| | | | |
|---|---|---|---|
| 2012/0231727 A1* | 9/2012 | Nagata ................... | G06Q 50/26 |
| | | | 455/3.06 |
| 2016/0359363 A1 | 12/2016 | Sato et al. | |
| 2017/0161859 A1* | 6/2017 | Baumgartner ..... | G06Q 30/0202 |
| 2017/0220086 A1* | 8/2017 | Suzuki ................. | G06F 1/3212 |
| 2019/0391609 A1* | 12/2019 | Kato ...................... | H02J 3/004 |
| 2021/0013737 A1* | 1/2021 | Wu ........................ | H02H 7/263 |
| 2021/0103365 A1* | 4/2021 | Saito ....................... | G09B 9/00 |
| 2023/0420937 A1* | 12/2023 | Kuroda ........... | G06Q 10/06393 |

FOREIGN PATENT DOCUMENTS

| | | |
|---|---|---|
| JP | 2019-071710 A | 5/2019 |
| WO | WO 2013/065469 A1 | 5/2013 |

OTHER PUBLICATIONS

Extended European Search Report, mailed Jun. 24, 2024, for European Application No. 21834669.0.

* cited by examiner

[FIG. 1]
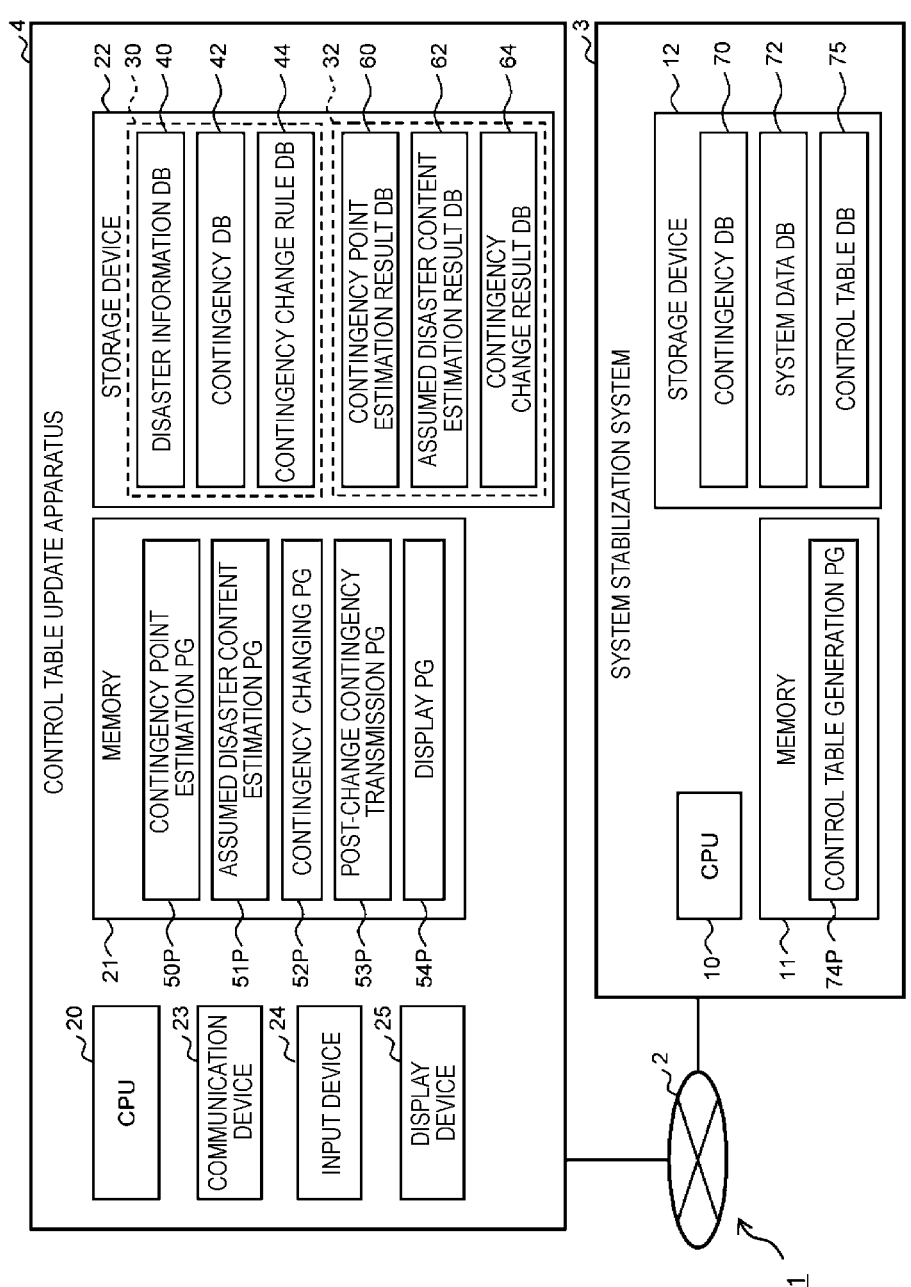

[FIG. 2]
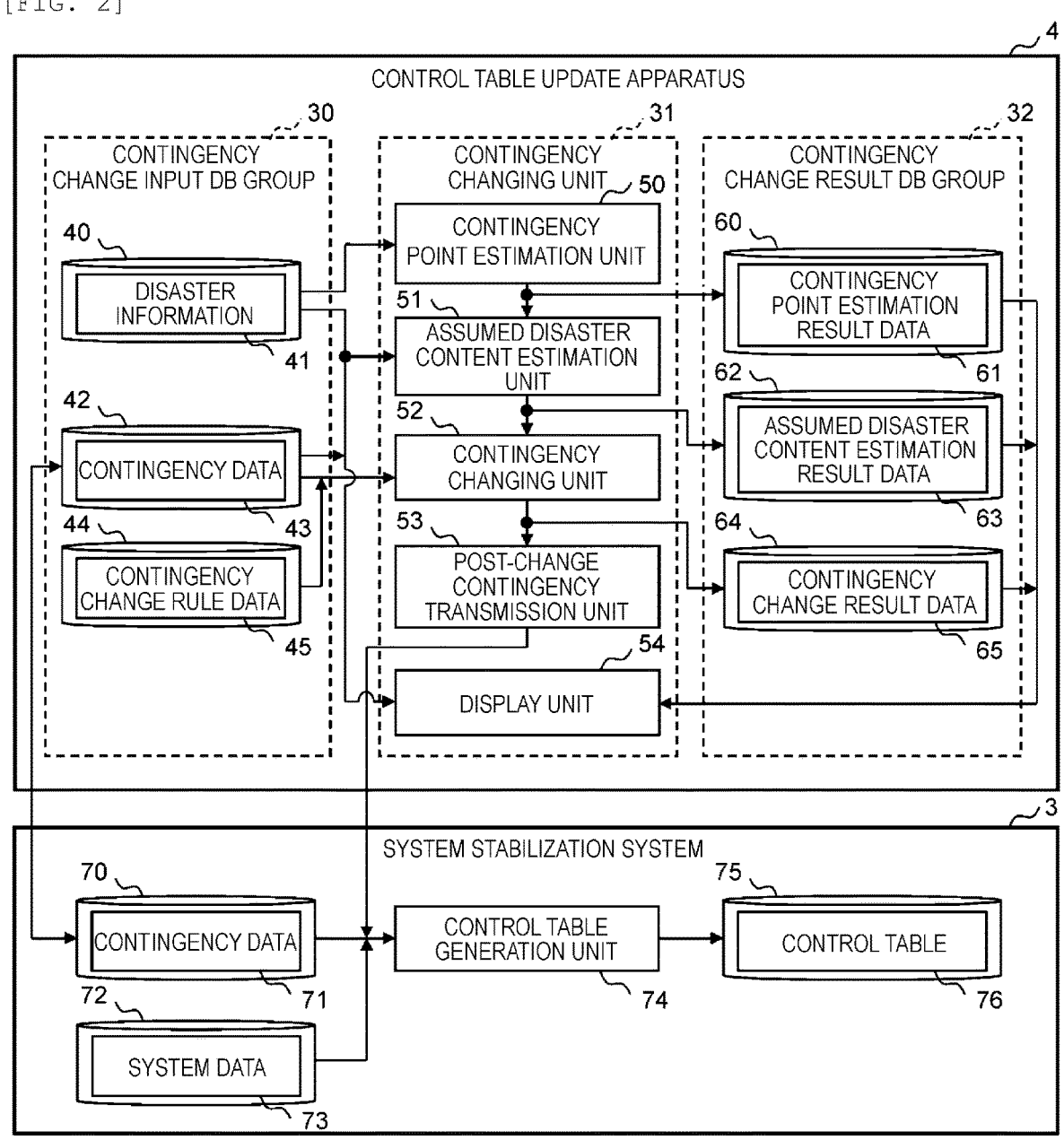

[FIG. 3]
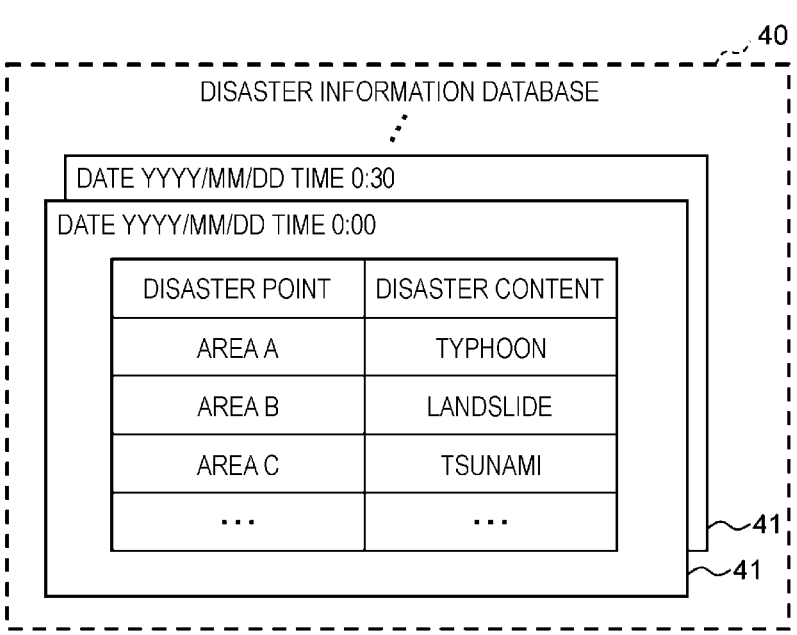

[FIG. 4]

CONTINGENCY DATA 43

| FAILURE SITE | FAILURE ASPECT |
|---|---|
| TRANSMISSION LINE A1 (TRANSMISSION END) | 3Φ6LG(ABCA'B'C') |
| TRANSMISSION LINE A1 (RECEPTION END) | 3Φ6LG(ABCA'B'C') |
| TRANSMISSION LINE A2 (TRANSMISSION END) | 3Φ6LG(ABCA'B'C') |
| TRANSMISSION LINE A2 (RECEPTION END) | 3Φ6LG(ABCA'B'C') |
| ... | ... |
| TRANSMISSION LINE B1 (TRANSMISSION END) | 3Φ4LG(ABB'C') |
| ... | ... |
| TRANSMISSION LINE C1 (TRANSMISSION END) | 3Φ4LG(ABB'C') |
| ... | ... |

CONTINGENCY CHANGE RULE DATA 45

| DISASTER POINT | DISASTER CONTENT | CONTINGENCY CHANGE CONTENT |
|---|---|---|
| AREA A | TYPHOON | 4-LINE GROUND FAILURE IN AREA A |
| | LANDSLIDE | DROPOUT ON POWER SUPPLY 1 SITE IN AREA A |
| | TSUNAMI | NOT CHANGED |
| . . . | . . . | . . . |
| AREA B | TYPHOON | 4-LINE GROUND FAILURE IN AREA B |
| | LANDSLIDE | DROPOUT ON POWER SUPPLY 1 SITE IN AREA B |
| | TSUNAMI | DROPOUT ON POWER SUPPLY 1 SITE IN AREA BC |
| . . . | . . . | . . . |
| AREA C | TYPHOON | 6-LINE GROUND FAILURE IN AREA C |
| | LANDSLIDE | DROPOUT ON POWER SUPPLY 1 SITE IN AREA C |
| | TSUNAMI | DROPOUT ON POWER SUPPLY 1 SITE IN AREA BC |
| . . . | . . . | . . . |

45A     45B     45C

[FIG. 6]
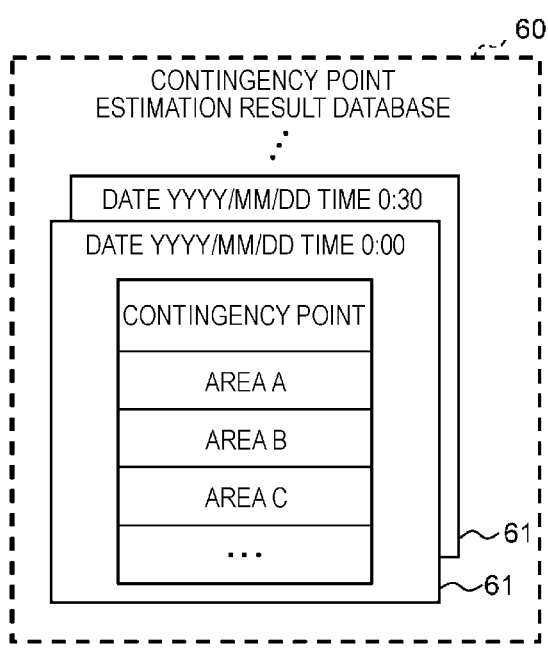

[FIG. 7]
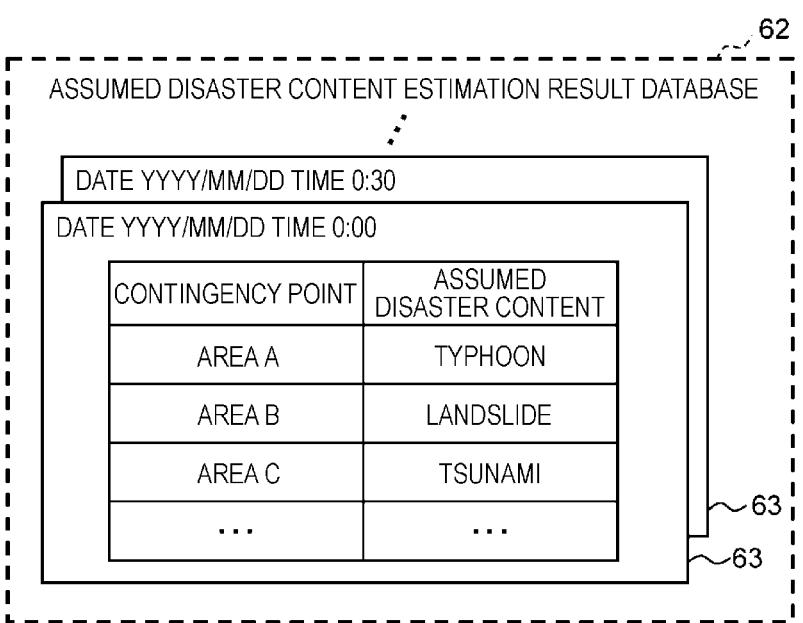

[FIG. 8]
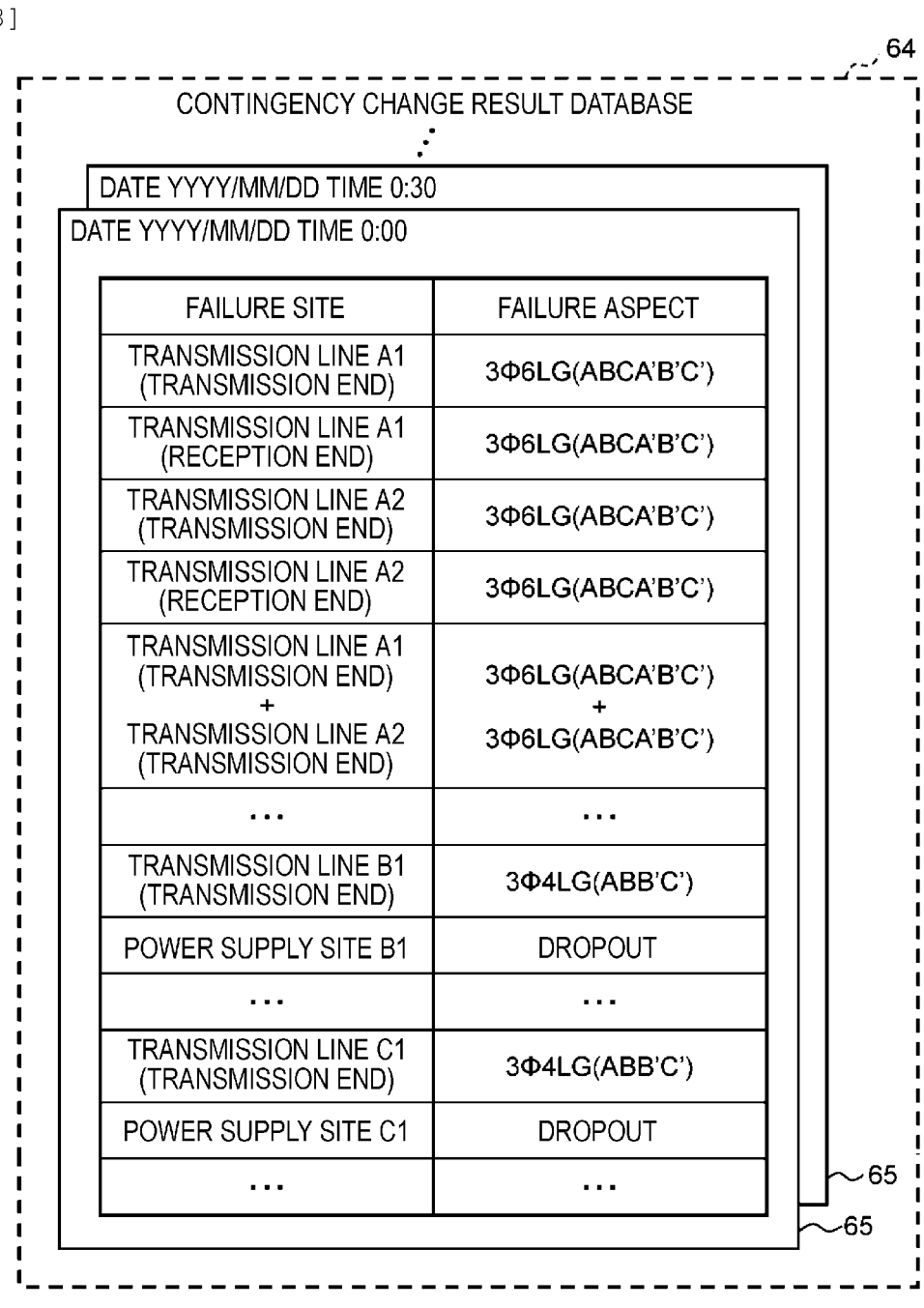

[FIG. 9A]

CONTROL TABLE DATABASE

DATE YYYY/MM/DD TIME 0:30

DATE YYYY/MM/DD TIME 0:00

| FAILURE SITE | FAILURE TYPE | | POWER-SUPPLY-CONSTRAINED TARGET |
| --- | --- | --- | --- |
| | FAILURE ASPECT | | |
| TRANSMISSION LINE A1 (TRANSMISSION END) | 3Φ6LG(ABCA'B'C') | | GENERATOR G1 + G2 + G3 |
| TRANSMISSION LINE A1 (RECEPTION END) | 3Φ6LG(ABCA'B'C') | | GENERATOR G1 + G2 + G3 |
| TRANSMISSION LINE A2 (TRANSMISSION END) | 3Φ6LG(ABCA'B'C') | | GENERATOR G1 + G2 + G3 |
| TRANSMISSION LINE A2 (RECEPTION END) | 3Φ6LG(ABCA'B'C') | | GENERATOR G1 + G2 |
| ⋮ | ⋮ | | ⋮ |
| TRANSMISSION LINE B1 (TRANSMISSION END) | 3Φ4LG(ABB'C') | | GENERATOR G1 + G2 |
| ⋮ | ⋮ | | ⋮ |
| TRANSMISSION LINE C1 (TRANSMISSION END) | 3Φ4LG(ABB'C') | | GENERATOR G1 |
| ⋮ | ⋮ | | ⋮ |

CONTROL TABLE DATABASE — 75

DATE YYYY/MM/DD TIME 0:30

DATE YYYY/MM/DD TIME 0:00

| FAILURE TYPE | | POWER-SUPPLY-CONSTRAINED TARGET |
| FAILURE SITE | FAILURE ASPECT | |
|---|---|---|
| TRANSMISSION LINE A1 (TRANSMISSION END) | $3\Phi6LG(ABCA'B'C')$ | GENERATOR G1 + G2 + G3 |
| TRANSMISSION LINE A1 (RECEPTION END) | $3\Phi6LG(ABCA'B'C')$ | GENERATOR G1 + G2 + G3 |
| TRANSMISSION LINE A2 (TRANSMISSION END) | $3\Phi6LG(ABCA'B'C')$ | GENERATOR G1 + G2 + G3 |
| TRANSMISSION LINE A2 (RECEPTION END) | $3\Phi6LG(ABCA'B'C')$ | GENERATOR G1 + G2 |
| TRANSMISSION LINE A1 (TRANSMISSION END) + TRANSMISSION LINE A2 (TRANSMISSION END) | $3\Phi6LG(ABCA'B'C')$ + $3\Phi6LG(ABCA'B'C')$ | GENERATOR G1 + G2 + G3 + G4 |
| ... | ... | ... |
| TRANSMISSION LINE B1 (TRANSMISSION END) | $3\Phi4LG(ABB'C')$ | GENERATOR G1 + G2 |
| POWER SUPPLY SITE B1 | DROPOUT | LOAD L1 |
| ... | ... | ... |
| TRANSMISSION LINE C1 (TRANSMISSION END) | $3\Phi4LG(ABB'C')$ | GENERATOR G1 |
| POWER SUPPLY SITE B1 + C1 | DROPOUT | LOAD L1 + L2 |
| ... | ... | ... |

76

76

[FIG. 10]
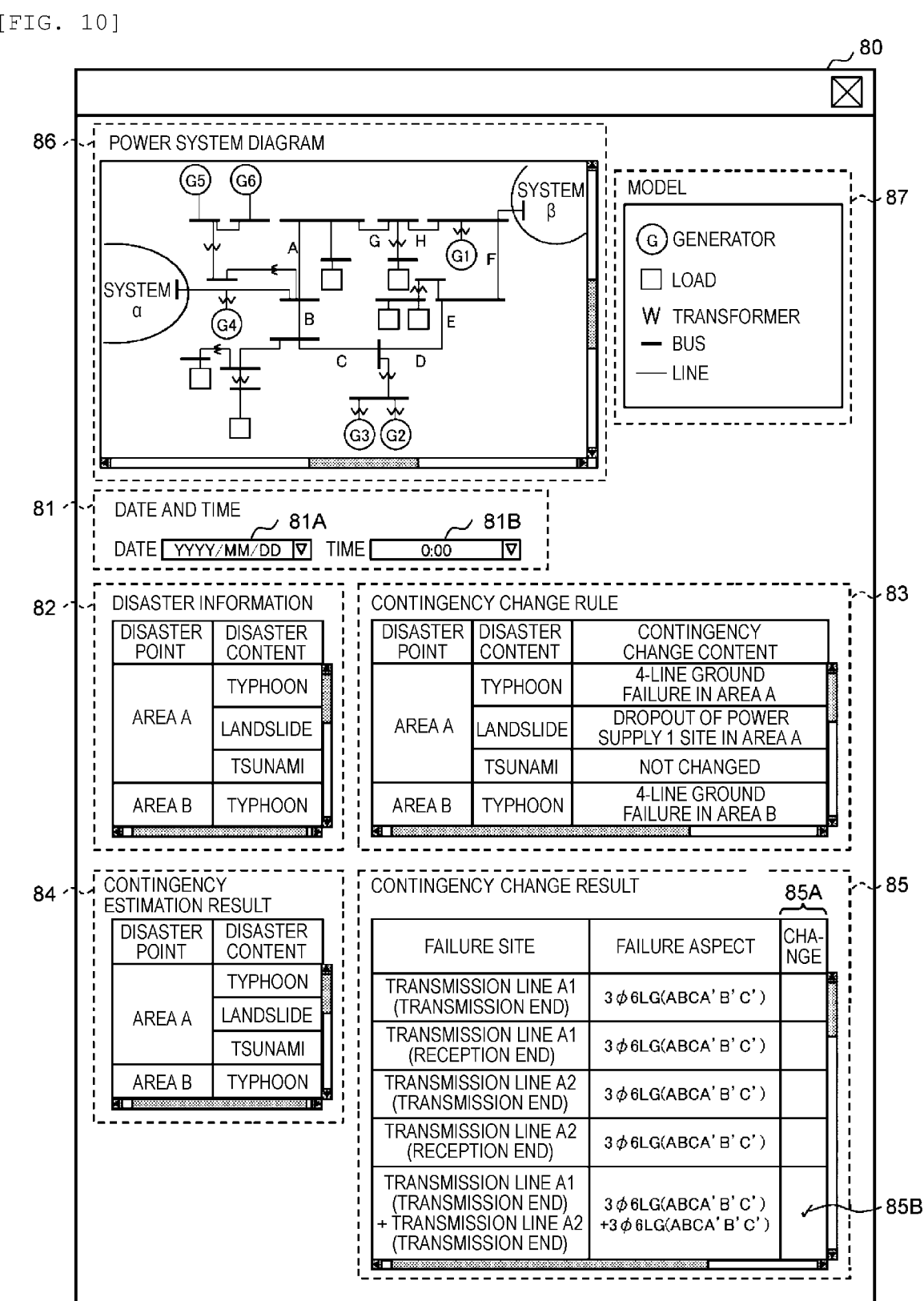

[FIG. 11]
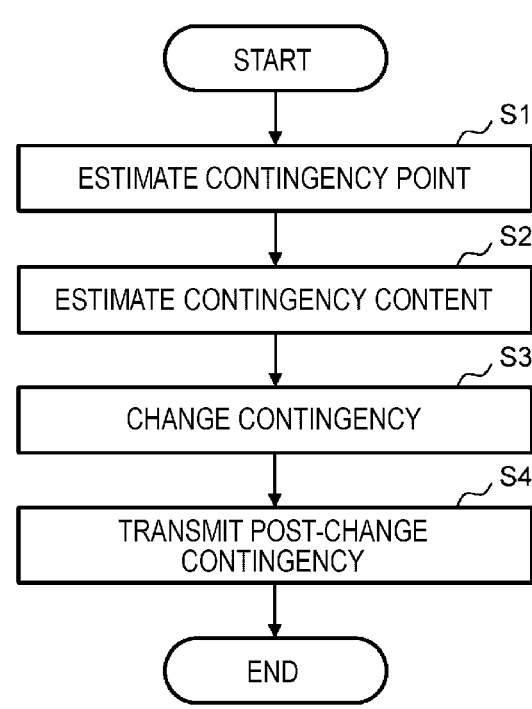

[FIG. 12]
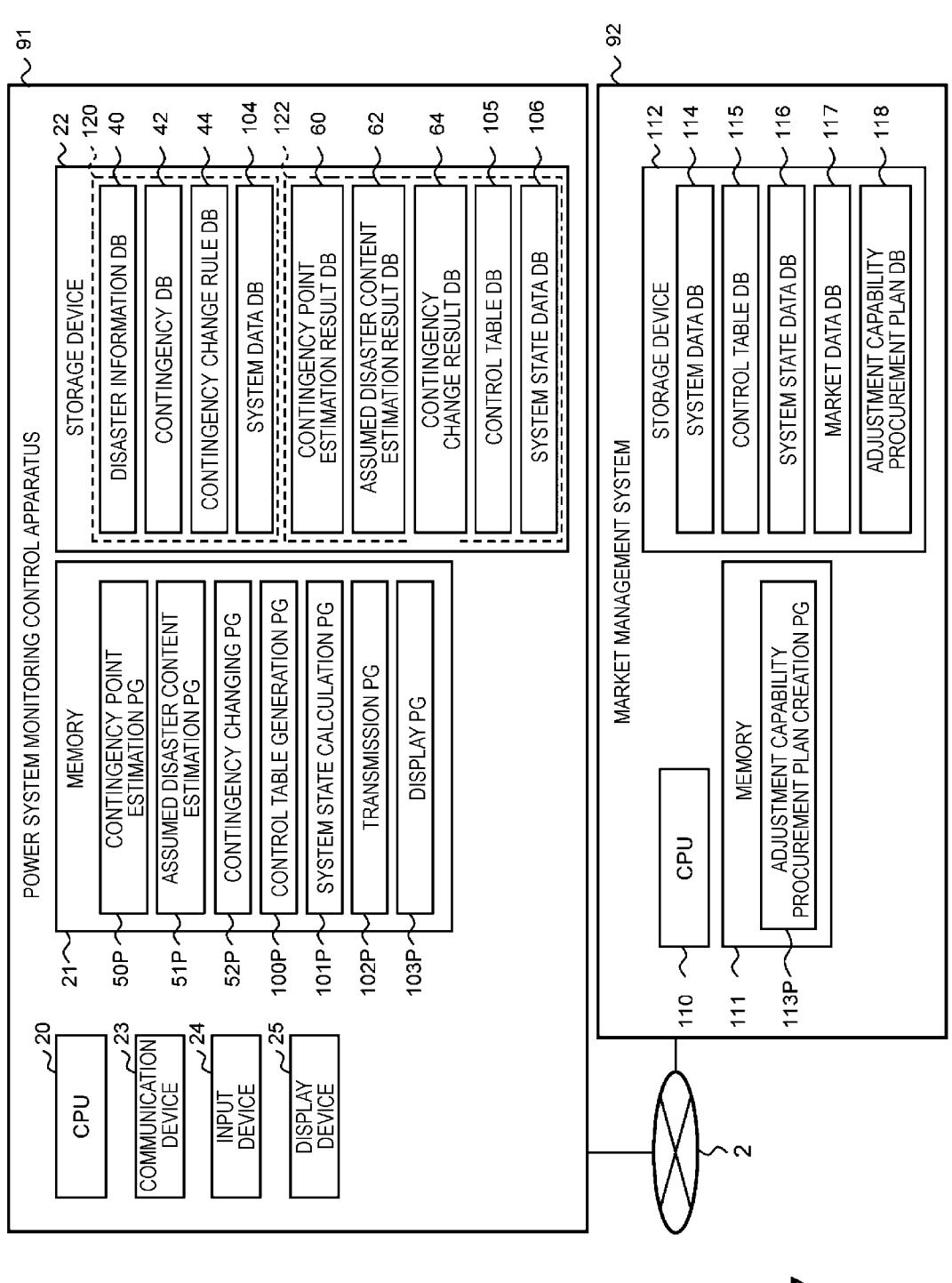

[FIG. 13]

[FIG. 14]
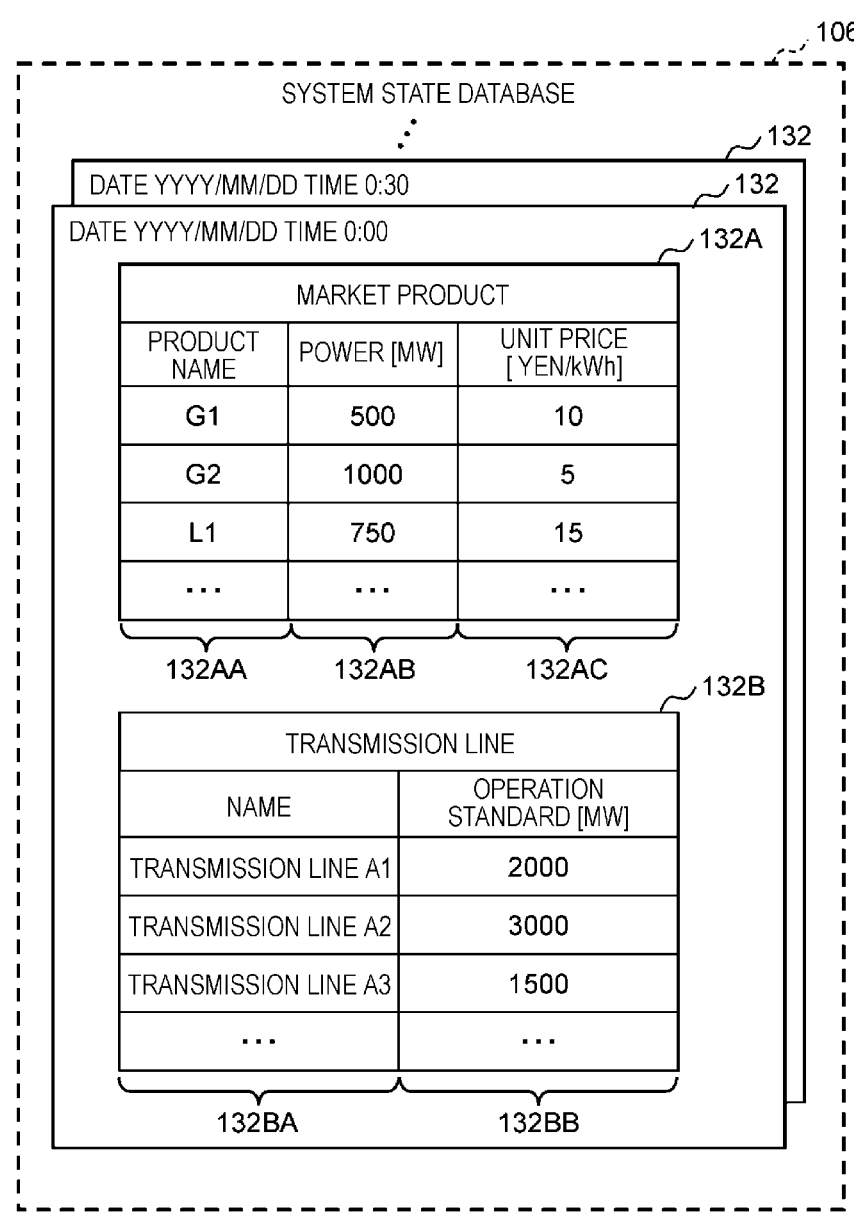

[FIG. 15]
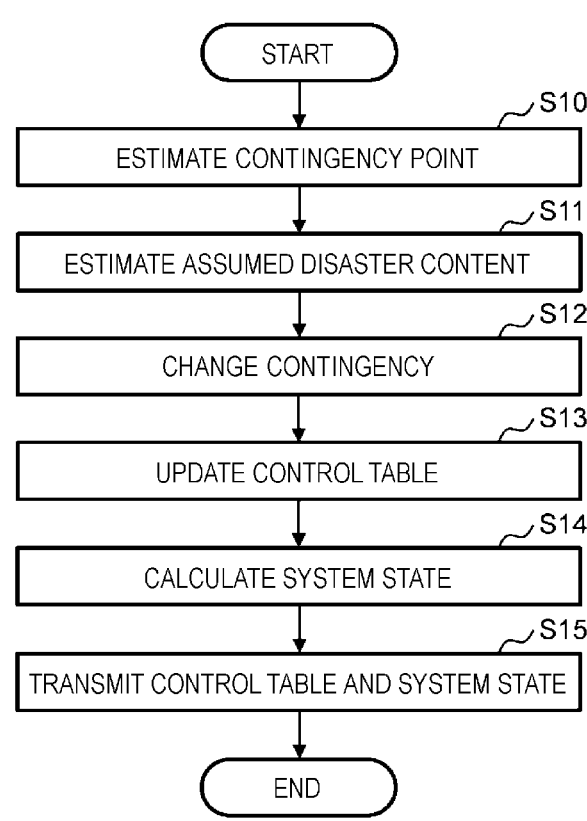

[FIG. 16]
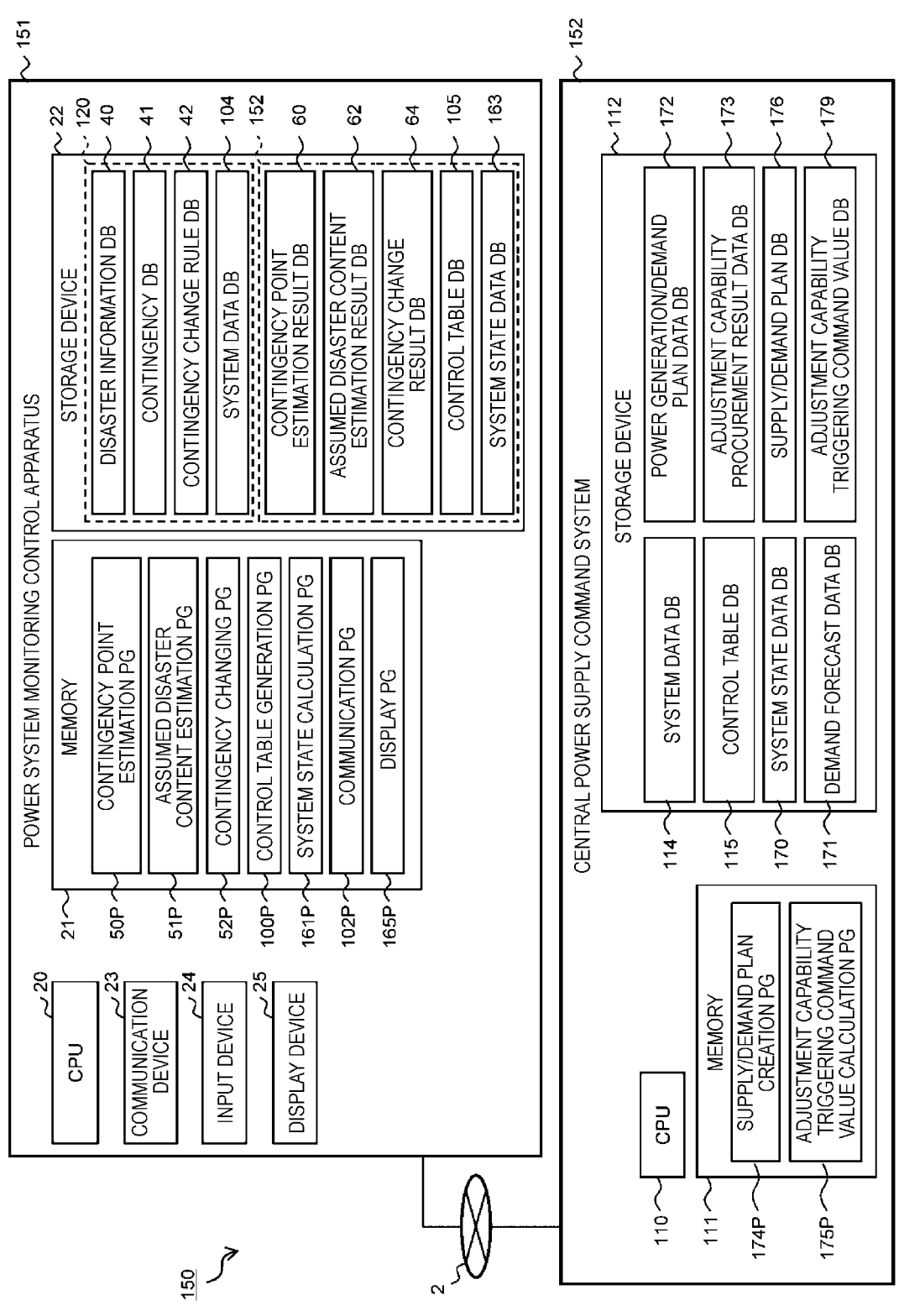

[FIG. 17]

[FIG. 18]
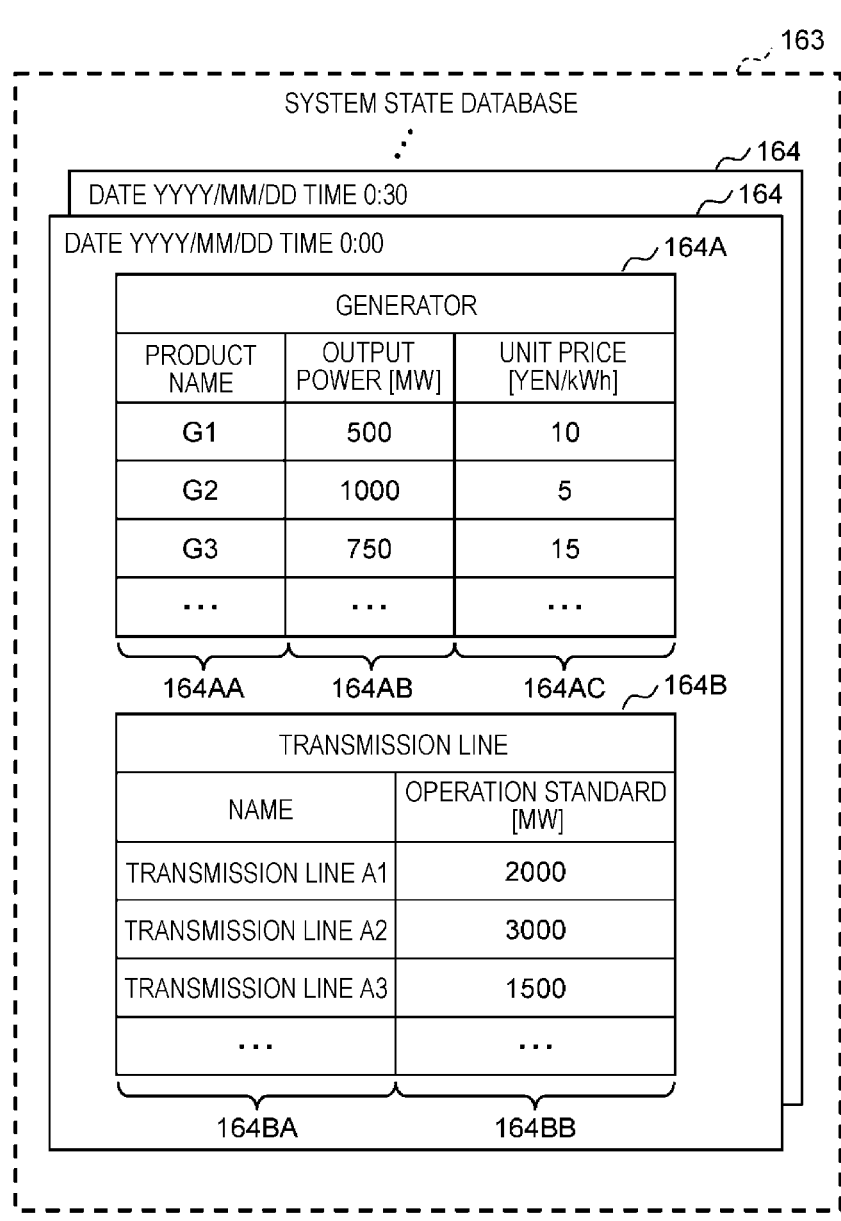

POWER SYSTEM MONITORING CONTROL SYSTEM AND METHOD

TECHNICAL FIELD

The present invention relates to a power system monitoring control system and method and is particularly suitable for application to a power system monitoring control system including a system stabilization system.

BACKGROUND ART

Compared to the power energy generated and consumed by the entire power system, the amount of energy that can be stored is small. For this reason, in the operation of the power system, "simultaneous equality", in which the difference between the amount of power generation and the amount of demand is always maintained within a certain range is required to be observed.

The generated power is supplied to consumers via transmission lines, but the upper limit of the amount of power that can flow through each transmission line is determined by the operation standard of the transmission line. The operator of the power system calculates a thermal capacity for each transmission line, a power capacity of which stability (transient stability, voltage stability, frequency, and the like) during the occurrence of the failure can be maintained, or the like based on the results of preliminary simulations and desk studies and sets the lowest value (that is, the strictest value) among the values as the operation standard for the transmission line.

When the operation standard is determined based on the constraints of maintaining the stability during the occurrence of the failure, the amount of power flowing through the transmission line can be increased (the operation standard can be relaxed) by using the system stabilization system. Herein, the "system stabilization system" refers to a power system that, has a function of preventing, in advance, proceeding into a situation that the influence is likely to spread and cause a large-scale blackout in the case of occurrence of a failure in the power system due to an earthquake, lightning strike, tsunami, or the like.

Actually, in the case of several contingencies, the system stabilization system retains a control table in which each of the generators (power-supply-constrained target) to be constrained in power supply and the target (load-constrained target) to be load-constrained target is registered in advance so as to maintain the stability of the power system. Then, when the failure actually occurs in the power system, the system stabilization system determines the power-supply-constrained target or load-constrained target according to the failure content with reference to the control table and maintains the stability of the power system by disconnecting the determined power-supply-constrained target or load-constrained target from the power system. Since the stability can be maintained at the time of a failure by the function of the system stabilization system, the amount of power flowing through the transmission line can be increased, and operation standard can be relaxed.

As a background technology related to relaxation of the operation standard by the system stabilization system, JP-A-2019-71710 (PTL 1) discloses "system constraints which are technical constraints in various sites of the power system and plan information which is a plan for power procurement are acquired from a market management system, post-change system constraints which are results of reviewing the system constraints are generated, and the generated post-change system constraints are output to the market management system". It is noted that, the "system constraint" in this PTL 1 corresponds to the "operation standard" in this application.

CITATION LIST

Patent Literature

PTL 1: JP-A-2019-71710

SUMMARY OF INVENTION

Technical Problem

By the way, in PTL 1, at the time of generating the control table for the system stabilization system, fixed contingencies in the target power system are used. These failures are determined based on results of preliminary simulations, desk studies, and the like, and the failures such as a 4-equipment failure (N-4 failure), a power supply 1 site dropout, and the like due to the occurrence of large-scale disasters such as earthquakes and tsunamis and rare frequent disasters are not targeted. Therefore, a control table corresponding to this type of disaster (large-scale disaster or rare disaster) is not generated, and there is a risk of blackout occurring during the occurrence of the disasters.

In addition, since the system stabilization system is a protection power system, the accountability for the creation and updating of the control table is required to be fulfilled. In the case of a fixed contingency, the accountability can be fulfilled by disclosing the conditions and results of preliminary simulations and desk studies, but when the contingency assumed at the time of generating the control table is allowed to be dynamically changed according to a situation, the transparency of change conditions and results is required to be ensured.

The present invention is to propose a power system monitoring control system and method that can improve supply reliability and resiliency of a power system while fulfilling the accountability.

Solution to Problem

In order to solve such a problem, in the present invention, there is provided a power system monitoring control system that retains a control table in which a control target to be controlled to maintain stability of a power system when a failure occurs for each type of the failure is registered and, when the failure occurs in the power system, controls the control target according to the type of the failure according to the control table, the power system monitoring control system including: an contingency point estimation unit that estimates an contingency point which is an occurrence point of the failure assumed in the power system based on predetermined disaster information; an assumed disaster content estimation unit that estimates, for each contingency point, an assumed disaster content which is a content of a disaster assumed to occur at the contingency point based on the disaster information and an estimation result of the contingency point estimation unit; a contingency changing unit that changes the contingency data based on an estimation result of the assumed disaster content estimation unit, contingency data including an occurrence site and an aspect of each of the failures assumed to occur in the power system, and an contingency change rule including a change rule of the contingency data; and a control table generation unit that generates the control table based on the contingency data, wherein the control table generation unit updates the control table based on the contingency data changed by the contingency changing unit.

In addition, in the present invention, there is provided a power system monitoring control method executed by a power system monitoring control system that retains a control table in which a control target to be controlled to maintain stability of a power system when a failure occurs for each type of the failure is registered and, when the failure occurs in the power system, controls the control target according to the type of the failure according to the control table, the power system monitoring control method including: estimating an contingency point which is an occurrence point of the failure assumed in the power system based on predetermined disaster information; estimating, for each contingency point, an assumed disaster content which is a content of the disaster that is assumed to occur at the contingency point based on the disaster information and an estimation result of the contingency point; changing the contingency data based on an estimation result of the assumed disaster content at each contingency point, contingency data including an occurrence site and an aspect of each of the failures assumed to occur in the power system, and an contingency change rule including an contingency data change rule; and updating the control table based on changed contingency data.

According to the power system monitoring control system and method of the present invention, since a control table in which a 4-equipment failure (N-4 failure), a power supply 1 site dropout, and the like due to the occurrence of large-scale disasters such as earthquakes and tsunamis and rare frequent disasters are also targeted can be created, a large-scale blackout can be prevented even during the occurrence of such a disaster.

In addition, according to the power system monitoring control system and method, since the grounds for the contents of the control table can be indicated by presenting the contingency change rule, the accountability for the control table can be sufficiently fulfilled.

Advantageous Effects of Invention

According to the present invention, it is possible to realize a power system monitoring control system and method that can improve supply reliability and resiliency of a power system while fulfilling the accountability.

BRIEF DESCRIPTION OF DRAWINGS

FIG. 1 is a block diagram illustrating the overall configuration of a power system monitoring control system according to a first embodiment.

FIG. 2 is a block diagram illustrating a logical configuration of a power system monitoring control apparatus and a system stabilization system according to the first embodiment.

FIG. 3 is a conceptual diagram illustrating a disaster information database and disaster information.

FIG. 4 is a conceptual diagram illustrating an contingency database and contingency data.

FIG. 5 is a conceptual diagram illustrating an contingency change rule database and an contingency change rule.

FIG. 6 is a conceptual diagram illustrating an contingency point estimation result database and contingency point estimation result data.

FIG. 7 is a conceptual diagram illustrating an assumed disaster content estimation result database and assumed disaster content estimation result data.

FIG. 8 is a conceptual diagram illustrating a contingency change result database and contingency change result data.

FIG. 9A is a conceptual diagram illustrating a control table database and a control table.

FIG. 9B is a conceptual diagram illustrating an updated control table database and a control table.

FIG. 10 is a diagram illustrating a configuration example of an contingency change result display screen.

FIG. 11 is a flowchart illustrating a flow of a series of processes executed by the power system monitoring control apparatus according to the first embodiment.

FIG. 12 is a block diagram illustrating the overall configuration of a power system monitoring control system according to a second embodiment.

FIG. 13 is a block diagram illustrating a logical configuration of a power system monitoring control apparatus and a market management system according to the second embodiment.

FIG. 14 is a conceptual diagram illustrating a system state data database and system state data according to the second embodiment.

FIG. 15 is a flowchart illustrating a flow of a series of processes executed by the power system monitoring control apparatus according to the second embodiment.

FIG. 16 is a block diagram illustrating the overall configuration of a power system monitoring control system according to a third embodiment.

FIG. 17 is a block diagram illustrating a logical configuration of the power system monitoring control apparatus and a central power supply command system according to the third embodiment.

FIG. 18 is a conceptual diagram illustrating a system state data database and system state data according to the third embodiment.

DESCRIPTION OF EMBODIMENTS

Hereinafter, an embodiment of the present invention will be described in detail with reference to the drawings.

(1) First Embodiment (1-1) Configuration of Power System Monitoring Control System According to the Present Embodiment In FIG. 1, numerical reference 1 generally indicates a power system monitoring control system according to the present embodiment. The power system monitoring control system 1 is configured to include a system stabilization system 3 and a power system monitoring control apparatus 4 which are connected via a network 2.

The system stabilization system 3 is a computer device having functions of retaining a control table 76 (FIG. 9A) in which a power-supply-constrained target or a load-constrained target for each failure (hereinafter, referred to as a contingency) that is assumed to occur in a target power system (hereinafter, referred to as a target power system) is registered and disconnecting the required power-supply-constrained target or the required load-constrained target from the target power system or performing output control based on the control table 76 when a contingency occurs in the target power system.

The system stabilization system 3 is configured to include information processing resources such as a CPU (Central Processing Unit) 10, a memory 11, and a storage device 12.

The CPU 10 is a processor that controls operations of the system stabilization system 3 as a whole. In addition, the memory 11 is configured with a RAM (Random Access Memory) or the like, and is used as a work memory for the CPU 10. The storage device 12 is configured with a non-volatile storage device such as a hard disk device or an SSD (Solid State Drive) and is used to store data and programs to be retained for a long period of time.

The power system monitoring control apparatus 4 is a computer device having a function of updating the control table 76 retained by the system stabilization system 3 and is configured to include a CPU 20, a memory 21, a storage device 22, a communication device 23, an input device 24, and a display device 25.

Since the functions and configurations of the CPU 20, the memory 21, and storage device 22 are the same as the corresponding components (the CPU 10, the memory 11, and the storage device 12) of the system stabilization system 3, the description thereof will be omitted herein. The communication device 23 is a communication device that performs protocol control during communication with the system stabilization system 3 via the network 2 and is configured with an NIC (Network Interface Card) or the like.

The input device 24 is used by an operator (hereafter, simply referred to as an operator) of the power system monitoring control apparatus 4 to input required information and instruction to the power system monitoring control apparatus 4 and is configured with, for example, a pointing device such as a keyboard and a mouse, a touch panel, a voice instruction device, and/or the like.

The display device 25 is used to display a necessary screen and information and is configured with a display device such as a liquid crystal display or an organic EL (Electro Luminescence) display. However, a printer device or an audio output device may be applied instead of or in addition to the display device.

(1-2) Logical Configuration of Power System Monitoring Control Apparatus and System Stabilization System FIG. 2 illustrates a logical configuration of the power system monitoring control apparatus 4 and the system stabilization system 3 according to the present embodiment. As illustrated in FIG. 2, the power system monitoring control apparatus 4 is configured to include a contingency change input database group 30, a contingency changing unit 31, and a contingency change result database group 32.

The contingency change input database group 30 is configured with a disaster information database 40, an contingency database 42, and an contingency change rule database 44.

As illustrated in FIG. 3, the disaster information database 40 is a database that stores disaster information 41 created in advance, for example, for each 30-minute time zone (hereinafter, simply referred to as a time zone). The "disaster information" in the present embodiment is information of a combination of an occurrence point ("disaster point") and a content ("disaster content") of a disaster that is likely to occur in the target power system in the corresponding time zone or that has occurred in the past. In the disaster information database 40, the disaster information 41 for each time zone is registered. For example, in the case of the example in FIG. 3, the disaster information 41 at "0:00" in "YYYY/MM/DD" represents a content that a disaster due to "typhoon" occurs in an "area A", "landslide" occurs in an "area B", and "tsunami" occurs in an "area C" in the time zone starting from the date and time ("0:00" in "YYYY/MM/DD").

It is noted that the "disaster point" in the disaster information 41 is not limited to the "area", but the "disaster point" may be a power line, a substation, or the like within the area or may be other point information. In addition, the "disaster content" in the disaster information database 40 is not limited to large-scale disasters such as typhoons, earthquakes, landslides, and tsunamis, but the "disaster content" may also be a content about a weather condition such as heavy snow, heavy rain, strong winds, or drought. The same applies to the following.

Furthermore, the "time zone" in the disaster information 41 may be either past or future date and time. When the time zone is a past date and time, the "disaster point" and "disaster content" of the disaster information 41 become actual results, and when the time zone is a future date and time, the "disaster Point" and "disaster content" become predictions. However, the disaster information 41 of the past time zone may be disaster information of a virtual disaster that is not an actual result. By doing so, the contingencies described later can be changed according to various disasters in each time zone.

The contingency database 42 is a database in which data (hereinafter, referred to as contingency data) 43 related to a plurality of fixed contingencies created in advance for the target power system is registered. As illustrated in FIG. 4, the contingency data 43 has a table configuration with a failure site column 43A and a failure aspect column 43B. In the contingency data 43, one row corresponds to one contingency related to the target power system.

The failure site column 43A stores the occurrence location of the corresponding contingency, and the failure aspect column 43B stores the aspect (the failure aspect) of the contingency. The "failure aspect" is a combination of a phase, the number of lines, the failure aspect, and the like of a failure line, and for example, in FIG. 4, "3 Φ6LG (AB-CA'B'C')" denotes a 3-phase 6-line ground failure and denotes that there are ground failures between an A phase, a B phase, and a C phase and an A' phase, a B' phase, and a C' phase.

Therefore, in the case of the example of FIG. 4, it is illustrated that, as the contingencies of the target power system, there is a 3-phase 6-line ground failure ("3Φ6LG (ABCA'B'C')") in "transmission line A1 (transmission end)", "transmission line A1 (reception end)", "transmission line A2 (transmission end)" and "transmission line A2 (reception end)", or the like, and there is a 3-phase 4-line ground failure ("3Φ4LG (ABB'C')" failure) in "transmission line B1 (transmission end)", "transmission line Cl (transmission end)", or the like.

The contingency change rule database 44 is a database in which data (hereinafter, referred to as an contingency change rule data) 45 of a rule (hereinafter, referred to as an contingency change rule) for changing a contengency registered in the contingency database 42 is stored and is created in advance by the operator. As illustrated in FIG. 5, the contingency change rule data 45 has a table configuration including a disaster point column 45A, a disaster content column 45B, and a contingency change content column 45C. In the contingency change rule data 45, one row corresponds to one contingency change rule.

The disaster point column 45A stores all points ("disaster points") where disaster is assumed to occur, and the disaster content column 45B stores contents ("disaster contents") of all the disasters which are assumed to occur at the corresponding disaster points. In addition, the contingency change content column 45C stores a change content (hereinafter, referred to as a contingency change content) of a contingency which is assumed to occur when the corresponding disaster content occurs at the corresponding disaster point. Since the contingency change contents differ according to the combination of the disaster point and the disaster content, each contingency change content is a content according to the combination of the disaster point and the disaster content.

Therefore, in the case of the example of FIG. 5, for example in "area A", it is illustrated that disasters such as "typhoon", "landslide", and "tsunami" are assumed to occur, and when the "typhoon" approaches, the "4-line ground failure in the area A (4-line ground failure in the area A)" is to be added to the original contingency, and when the "landslide" occurs, the "dropout on the power supply 1 site in the area A (dropout on the power supply 1 site in the area A)" is to be added to the original contingency. It is noted that FIG. 5 also illustrates that there is no contingency even when "tsunami" occurs in the "area A".

By providing such an contingency change rule database 44, the contingencies can be changed according to various disasters at various points. In addition, since the content of change in the contingency with respect to the disaster point and disaster content is clarified, transparency is ensured when the contingency is changed, and the accountability to third parties can be fulfilled.

On the other hand, the contingency changing unit 31 is configured to include an contingency point estimation unit 50, an assumed disaster content estimation unit 51, a contingency changing unit 52, a post-change contingency transmission unit 53, and a display unit 54.

The contingency point estimation unit 50 is a functional unit that is realized by the CPU 20 (FIG. 1) of the power system monitoring control apparatus 4 executing an contingency point estimation program 50P (FIG. 1) stored in the memory 21 (FIG. 1). The contingency point estimation unit 50 has a function of estimating each of all the points (hereinafter, referred to as contingency points) in the target power system where a contingency may occur due to some disaster for each time zone based on each disaster information 41 registered in the disaster information database 40. The contingency point estimation unit 50 registers the data representing each estimated contingency point for each time zone as contingency point estimation result data 61 in an contingency point estimation result database 60 of the contingency change result database group 32 described later and outputs the contingency point estimation result data 61 to the assumed disaster content estimation unit 51.

The assumed disaster content estimation unit 51 is a functional unit that is realized by the CPU 20 of the power system monitoring control apparatus 4 executing an assumed disaster content estimation program 51P (FIG. 1) stored in the memory 21. The assumed disaster content estimation unit 51 has a function of estimating the content (hereinafter, referred to as an assumed disaster content) of the disaster that is assumed to occur at each contingency point for each time zone based on the contingency point estimation result data 61 for each time zone provided from the contingency point estimation unit 50 and each disaster information 41 registered in the disaster information database 40. The assumed disaster content estimation unit 51 registers the data representing a combination of each contingency point for each time zone and the assumed disaster content estimated for the contingency point as assumed disaster content estimation result data 63 in an assumed disaster content estimation result database 62 of the contingency change result database group 32 described later and outputs the assumed disaster content estimation result data 63 to the contingency changing unit 52.

The contingency changing unit 52 is a functional unit that is realized by the CPU 20 of the power system monitoring control apparatus 4 executing a contingency changing program 52P (FIG. 1) stored in the memory 21. The contingency changing unit 52 has a function of calculating all contingencies for each time zone based on the assumed disaster content estimation result data 63 for each time zone provided from the assumed disaster content estimation unit 51, the contingency data 43 stored in the contingency database 42, and the contingency change rule data 45 stored in the contingency change rule database 44. The contingency changing unit 52 registers the calculated contingency data for each time zone as contingency change result data 65 in a contingency change result database 64 of the contingency change result database group 32 described later and outputs the contingency change result data 65 to the transmission unit 53.

The post-change contingency transmission unit 53 is a functional unit that is realized by the CPU 20 of the power system monitoring control apparatus 4 executing a post-change contingency transmission program 53P stored in the memory 21. The post-change contingency transmission unit 53 transmits the contingency change result data 65 for each time zone provided from the contingency changing unit 52 to the system stabilization system 3 via the communication device 23 (FIG. 1).

The display unit 54 is a functional unit that is realized by the CPU 20 of the power system monitoring control apparatus 4 executing a display program 54P stored in the memory 21. The display unit 54 generates an contingency change result display screen 80, which will be described later with reference to FIG. 10 based on the contingency point estimation result data 61 for each time zone stored in the contingency point estimation result database 60, the assumed disaster content estimation result data 63 for each time zone registered in the assumed disaster content estimation result database 62, and the contingency change result data 65 for each time zone stored in the contingency change result database 64. Then, the display unit 54 outputs screen data of the generated contingency change result display screen 80 to the display device 25 (FIG. 1) to display the contingency change result display screen 80 on the display device 25.

On the other hand, the contingency change result database group 32 is configured with the contingency point estimation result database 60, the assumed disaster content estimation result database 62, and the contingency change result database 64.

The contingency point estimation result database 60 is a database used for managing the contingency point estimated by the contingency point estimation unit 50 of the contingency changing unit 31 as described above. As illustrated in FIG. 6, the contingency point estimation result database 60 stores the contingency point estimation result data 61 for each time zone. Each contingency point estimation result data 61 includes data representing all contingency time points in the corresponding time zone. Therefore, in the case of the example of FIG. 6, the occurrence points (contingency points) of some failure assumed at "0:00" of "YYYY/MM/DD" estimated by the contingency point estimation unit 50 are indicated by three sites of the "area A", the "area B" and the "area C".

The assumed disaster content estimation result database 62 is a database used for managing the contingency content for each contingency point for each time zone estimated by the assumed disaster content estimation unit 51. As illustrated in FIG. 7, the assumed disaster content estimation result database 62 stores the assumed disaster content for each contingency point for each time zone. Therefore, in the case of the example of FIG. 7, it is illustrated that the assumed disaster content of the "area A" which is the contingency point of "0:00" of "YYYY/MM/DD" estimated by the assumed disaster content estimation unit 51 is "typhoon", the assumed disaster content of the "area B" is "landslide", and the assumed disaster content of the "area C" is "tsunami".

The contingency change result database 64 is a database used for managing the contingency change results changed by the contingency changing unit 52. As illustrated in FIG. 8, the contingency change result database 64 stores the contingency change result data 65 that is configured with the updated contingency data 43 (FIG. 4) for each time zone. Therefore, in the case of the example of FIG. 8, with respect to each contingency illustrated in FIG. 4, as the contingency of "0:00" in "YYYY/MM/DD", it is illustrated that a contingency where a 3-phase 6-line ground failure of "3Φ6LG (ABCA'B'C')" occurs on both the "transmission line A1 (transmission end)" and the "transmission line A2 (transmission end)", a contingency where the "dropout" occurs in the "power supply site B1", and a contingency where the "dropout" occurs in both the "power supply site B1" and the "power supply site Cl" are added.

It is noted that the contingency point estimation result database 60, the assumed disaster content estimation result database 62, and the contingency change result database 64 include and store the result data at the time of an intermediate process so as to be used in an appropriate situation in addition to the contingency point estimation result data 61, the assumed disaster content estimation result data 63, or the contingency change result data 65 as respective calculation results.

On the other hand, the system stabilization system 3 is configured to include an contingency database 70, a system data database 72, a control table generation unit 74, and a control table database 75, as illustrated in FIG. 2.

The contingency database 70 of the system stabilization system 3 is a database having the same configuration as the contingency database 42 (FIG. 4) of the power system monitoring control apparatus 4. The contingency database 70 stores the same contingency data 71 as the contingency data 43 stored in the contingency database 42, and when the contingency data 43 is updated, the contingency data 71 is also similarly updated in synchronization with the updating.

The system data database 72 is a database used for managing system data 73 required for power flow calculation, state estimation, and time series change calculation of the power system. The system data database 72 includes data such as system configuration of the power system, line impedance (R+jX), ground capacitance (susceptance: jB), system configuration and threshold value of pad data required for state estimation, generator data, and other required data are stored in advance as the system data 73.

The control table generation unit 74 is a functional unit that is realized by the CPU 10 (FIG. 1) of the system stabilization system 3 executing a control table generation program 74P (FIG. 1) stored in the memory 11 (FIG. 1). The control table generation unit 74 generates the control table 76 based on the contingency data 71 stored in the contingency database 70 and the system data 73 stored in the system data database 72 and stores the generated control table 76 in the table database 75.

In addition, when the contingency change result data 65 which is the contingency data 43 updated by the contingency changing unit 52 of the power system monitoring control apparatus 4 is transmitted, the control table generation unit 74 generates the new control table 76 for each time zone based on the contingency change result data 65, the contingency data 71 stored in the contingency database 70, and the system data 73 stored in the system data database 72. It is noted that the control table 76 created at this time is a relaxed control table on the premise of using the system stabilization system 3.

Then, the control table generation unit 74 overwrites the data of the control table 76 stored in the control table database 75 with the data of the new control table 76 generated for each time zone. Therefore, the control table 76 stored in the control table database 75 is updated to the new control table 76.

The control table database 75 is a database used for managing the control table 76 generated by the control table generation unit 74 for each time zone. As illustrated in FIG. 9A, the control table database 75 stores the data of the control table 76 for each time zone.

Each control table 76 includes information on the failure types and control targets of all the failures (contingencies) that are assumed to occur in the respective corresponding time zones. The "failure type" is configured with information on a "failure site" representing the occurrence site of a failure (contingency) that is assumed to occur in the corresponding time zone and information on a "failure aspect" representing the aspect of the failure assumed at that failure point. In addition, the "control target" stores information representing the power-supply-constrained target or the load-constrained target (hereinafter collectively referred to as a control target) to be disconnected in the case where the contingency corresponding to the corresponding time zone occurs.

Therefore, in the case of the example of FIG. 9A, as the types of failures that are assumed to occur in the time zone of "0:00" of "YYYY/MM/DD", there is "3Φ6LG (AB-CA'B'C')" (3-phase 6-line ground failure) in the "transmission line A1 (transmission end)" or the "transmission line A1 (reception end)", the "transmission line A2 (transmission end)" and the "transmission line A2 (reception end)", or the like, and for example, when the 3-phase 6-line ground failure occurs in the "transmission line A1 (transmission end)", the "transmission line A1 (reception end)", or the "transmission line A2 (transmission end)", it is illustrated to be stipulated that all three generators labeled with "G1", "G2", and "G3" are to be controlled or disconnected from the power system ("generators G1+G2+G3").

(1-3) Configuration of Contingency Change Result Display Screen

FIG. 10 illustrates a configuration example of the contingency change result display screen 80 displayed on the display device 25 (FIG. 1) by the display unit 54 (FIG. 2) of the power system monitoring control apparatus 4 as described above. The contingency change result display screen 80 is configured to include a time zone designation area 81, a disaster information display area 82, an contingency change rule display area 83, an assumed disaster estimation result display area 84, a contingency change result display area 85, a system diagram display area 86, and a model display area 87.

The time zone designation area 81 is provided with a date designation column 81A and a time zone designation column 81B, a date on which the content of the post-change contingency data 43 is desired to be checked can be selected in a pull-down method to be displayed in the date designation column 81A, and a start time of the time zone within the date on which the post-change contingency data 43 is desired to be checked can be selected in a pull-down method to be displayed in the time zone designation column 81B. It is noted that, in the following description, the time zone designated by the time zone designation area 81 will be referred to as an designated time zone.

A list of disaster information 41 registered in the disaster information database 40 (FIG. 3) for a designated time zone is displayed on the disaster information display area 82, and a list of the contingency change rules registered as the contingency change rule data 45 in the contingency change rule database 44 (FIG. 2) is displayed on the contingency change rule display area 83.

Furthermore, a list of the assumed disaster content for each contingency site in the designated time zone stored in the assumed disaster content estimation result database 62 (FIG. 7) is displayed on the assumed disaster estimation result display area 84, and a list of each contingency (the failure point and failure aspect) in the post-change designated time zone changed by the contingency changing unit 52 (FIG. 2) is displayed on the contingency change result display area 85.

It is noted that a change column 85A corresponding to each post-change contingency is provided on the "list of the contingencies in the post-change designated time zone", and a check mark 85B is displayed in the change column 85A corresponding to the contingency (added in FIG. 10) changed from the original content. As a result, the operator can immediately recognize which contingency has been changed based on the check mark 85B.

Furthermore, a system diagram of the target power system is displayed on the system diagram display area 86, and models such as symbols in the system diagram are displayed on the model display area 87. As a result, the operator can easily recognize the positions of the disaster occurrence points and the contingency points based on system diagrams and models.

(1-4) First Power System Monitoring Control Process

FIG. 11 illustrates a flow of a series of processes (hereinafter, referred to as first power system monitoring control processes) executed by the power system monitoring control apparatus 4 to update the control table 76 retained by the system stabilization system 3 as described above.

When the first power system monitoring control process illustrated in FIG. 11 is started in the power system monitoring control apparatus 4, first, the contingency point estimation unit 50 (FIG. 2) estimates the occurrence point (contingency point) of the failure assumed to occur in the target power system for each time zone, registers the estimation result as the contingency point estimation result data 61 in the contingency point estimation result database 60 (FIG. 6), and outputs the contingency point estimation result data 61 to the assumed disaster content estimation unit 51 (FIG. 2) (S1).

Specifically, the contingency point estimation unit 50 extracts all the "disaster points" included in the disaster information 41 based on the disaster information 41 (FIG. 3) for each time zone stored in the disaster information database 40 (FIG. 1), registers the contingency point estimation result data 61 in which each extracted "disaster point" is designated as the contingency point in the contingency point estimation result database 60, and outputs the contingency point estimation result data 61 to the assumed disaster content estimation unit 51.

Next, the assumed disaster content estimation unit 51 (FIG. 2) estimates the assumed disaster content at each contingency point for each time zone, registers the estimation result as the estimated disaster content estimation result data 63 in the assumed disaster content estimation result database 62, and outputs the estimated disaster content estimation result data 63 to the contingency changing unit 52 (S2).

Specifically, the assumed disaster content estimation unit 51 acquires the "disaster content" of each "disaster point" in the disaster information 41 for each time zone as the assumed disaster content of the corresponding contingency point based on the disaster information 41 (FIG. 3) for each time zone stored in the disaster information database 40 (FIG. 1). Then, the assumed disaster content estimation unit 51 generates the assumed disaster content estimation result data 63 described above with reference to FIG. 7 based on the acquired assumed disaster content of each contingency point, registers the generated assumed disaster content estimation result data 63 in the assumed disaster content estimation result database 62, and outputs the generated assumed disaster content estimation result data 63 to the contingency changing unit 52.

Next, the contingency changing unit 52 (FIG. 2) updates the contingency data 43 registered in the contingency database 42 based on the assumed disaster content estimation result data 63 provided from the assumed disaster content estimation unit 51 and each contingency change rule registered as the contingency change rule data 45 in the contingency change rule database 44 (S3).

Specifically, the contingency changing unit 52 sequentially compares each combination of the contingency point and the contingency content in the assumed disaster content estimation result data 63 with the combination of the disaster point and the disaster content of each contingency change rule for each time zone and extracts the contingency change content ("contingency change content" in FIG. 5) of the contingency change rule in which the combination of the contingency point and the contingency content match the combination of the disaster point and the disaster content.

For example, in the case of the example in FIG. 7, since the combination of the contingency point of the "area A" in the assumed disaster content estimation result for "date YYYY/MM/DD time 0:00" and the assumed disaster content of "typhoon" matches the combination of the disaster point of the "area A" and the disaster content of "typhoon" in FIG. 5, the contingency changing unit 52 extracts "4-line ground failure in the area A" as the contingency change content of the contingency change rule. In addition, similarly, the contingency changing unit 52 extracts "dropout of power supply 1 site in the area B", which is the contingency change content of the contingency change rule corresponding to the combination of the "area B" and "landslide" in FIG. 5 and "dropout of power supply 1 site in the area BC" which is the contingency change content of the contingency change rule corresponding to the combination of the "area C" and "tsunami".

Next, the contingency changing unit 52 generates the contingency change result data 65 by adding each contingency change content extracted as described above to the original contingency data 43 (FIG. 4). For example, in the case of the above example, as illustrated in FIG. 8, the contingency change result data 65 is generated so as to add, to contingency data 43, simultaneous occurrence of 3-phase 6-line ground failures at the transmission ends of the transmission lines A1 and A2 (the failure site is "transmission line A1 (transmission end)+Transmission line A2 (transmission end)", and the row has a failure aspect of "3Φ6LG (AB-CA'B'C')"+"3Φ6LG (ABCA'B'C')"), dropout of power supply site B1 (the failure site is "power supply site B1", and the row has a failure aspect of "dropout"), and simultaneous dropout of power supply sites B1 and B2 (the failure site is "power supply site B1+B2", and the row has a failure aspect of "dropout"). The contingency changing unit 52 executes the above process for each time zone.

Then, the contingency changing unit 52 registers the contingency change result data 65 for each time zone generated as described above in the contingency change result database 64 and outputs the contingency change result data 65 to the post-change contingency transmission unit 53.

After that, the post-change contingency transmission unit 53 outputs the contingency change result data 65 to the system stabilization system 3 (S4), and a series of the first power system monitoring control process ends.

It is noted that, after that, the new updated control table 76 for each time zone is generated based on the contingency change result data 65 by the control table generation unit 74 (FIG. 2) of the system stabilization system 3.

For example, in the case of the above example, when the control table 76 before updating is assumed to have such a content as in FIG. 9A, as the control table of "0:00" in "YYYY/MM/DD", as illustrated in FIG. 9B, generated is the control table 76 in which the simultaneous occurrence of the failure of the 3-phase 6-line ground failure at each transmission end of the transmission line A1 and the transmission line A2 (the failure site of the failure type is the "transmission line A1 (transmission end)+transmission line A2 (transmission end)" and the failure aspect is the row of "3Φ6LG (ABCA'B'C')"+"3Φ6LG (ABCA'B'C')"), the dropout of the power supply site B1 (the failure site is the "power supply site B1" and the failure aspect is the row of the "dropout"), and the simultaneous dropout of the power supply sites B1 and B2 (the failure site of the failure type is the "power supply site B1+B2" and the failure aspect is the row of the "dropout") are added.

Then, the control table 76 for each time zone generated in this manner overwrites the data of the control table 76 stored in the control table database 75, so that the control table 76 is updated.

(1-5) Effects of the Present Embodiment

As described above, in the power system monitoring control system 1 of the present embodiment, the contingency data 43 is changed according to the contingency change rule created by the operator (general power transmission and distribution business operator), and the contingency data (contingency change result data 65) including failures other than fixed failures is generated based on the post-change contingency data 43 to update the control table 76, and the control table 76 can be updated based on this contingency data.

Therefore, according to the power system monitoring control system 1, since the control table 76 can be created for a 4-equipment failure (N-4 failure) and a power supply 1 site dropout due to the occurrence of large-scale disasters such as earthquakes and tsunamis and rare frequent disasters as a target, a large-scale blackout can be prevented from occurring even during the occurrence of such a disaster.

In addition, according to the power system monitoring control system 1, since the grounds for the contents of the control table 76 can be illustrated by presenting the contingency change rule data 45 or displaying the contingency change result display screen 80, the accountability for the control table 76 is fully fulfilled.

Therefore, according to the power system monitoring control system 1, the supply reliability and resiliency of the power system can be improved while fulfilling the accountability.

(2) Second Embodiment (2-1) Configuration of Power System Monitoring Control System According to the Present Embodiment FIG. 12, in which components corresponding to those in FIG. 1 are denoted by the same reference numerals, illustrates a power system monitoring control system 90 according to a second embodiment. The power system monitoring control system 90 is configured to include a power system monitoring control apparatus 91 and a market management system 92 that are connected via the network 2 and a system stabilization system (not illustrated).

The power system monitoring control apparatus 91 is a computer device having a function of updating the control table for each time zone in the same manner as in the first embodiment and calculating the state of the power system for each time zone based on the updated control table. The power system monitoring control apparatus 91 transmits the data of the updated control table for each time zone and the data (hereinafter, referred to as system state data) representing the calculated state of the power system for each time zone to the market management system 92.

The power system monitoring control apparatus 91 is configured with a computer device having the CPU 20, the memory 21, the storage device 22, the communication device 23, the input device 24, and the display device 25. The memory 21 stores a control table generation program 100P, a system state calculation program 101P, a transmission program 102P, and a display program 103P in addition to the contingency point estimation program 50P, the assumed disaster content estimation program 51P, and the contingency changing program 52P.

In addition, the storage device 22 of the power system monitoring control apparatus 91 stores a system data database 104, a control table database 105, and a system state data database 106 in addition to the disaster information database 40, the contingency database 42, the contingency change rule database 44, the contingency point estimation result database 60, the assumed disaster content estimation result database 62, and the contingency change result database 64.

The market management system 92 is a computer system that is installed in the power trading market and has a function of managing trading of a power product (hereinafter, referred to as a market product) in the power trading market. In addition to this function, the market management system 92 is also provided with a function of calculating the adjustment capability to be procured from the power trading market for each time zone by the operator (general power transmission and distribution business operator) who owns the power system monitoring control apparatus 91 as a procurement plan (hereinafter, referred to as an adjustment capability procurement plan) based on the updated control table for each time zone provided from the power system monitoring control apparatus 91, the system state data for each time zone, and the like and providing the calculated adjustment capability procurement plan to the operator.

The market management system 92 is configured to include information processing resources such as a CPU 110, a memory 111 and a storage device 112. Since the configurations and functions of the CPU 110, the memory 111 and the storage device 112 are the same as the corresponding components (the CPU 10, the memory 11, and the storage device 12) of the system stabilization system 3 of the first embodiment described above with reference to FIG. 1, the description thereof will be omitted herein.

The memory 111 of the market management system 92 stores an adjustment capability procurement plan creation program 113P which will be described later. In addition, the storage device 112 of the market management system 92 stores a system data database 114, a control table database 115, a system state data database 116, a market data database 117, and an adjustment capability procurement plan database 118.

Figure 13:
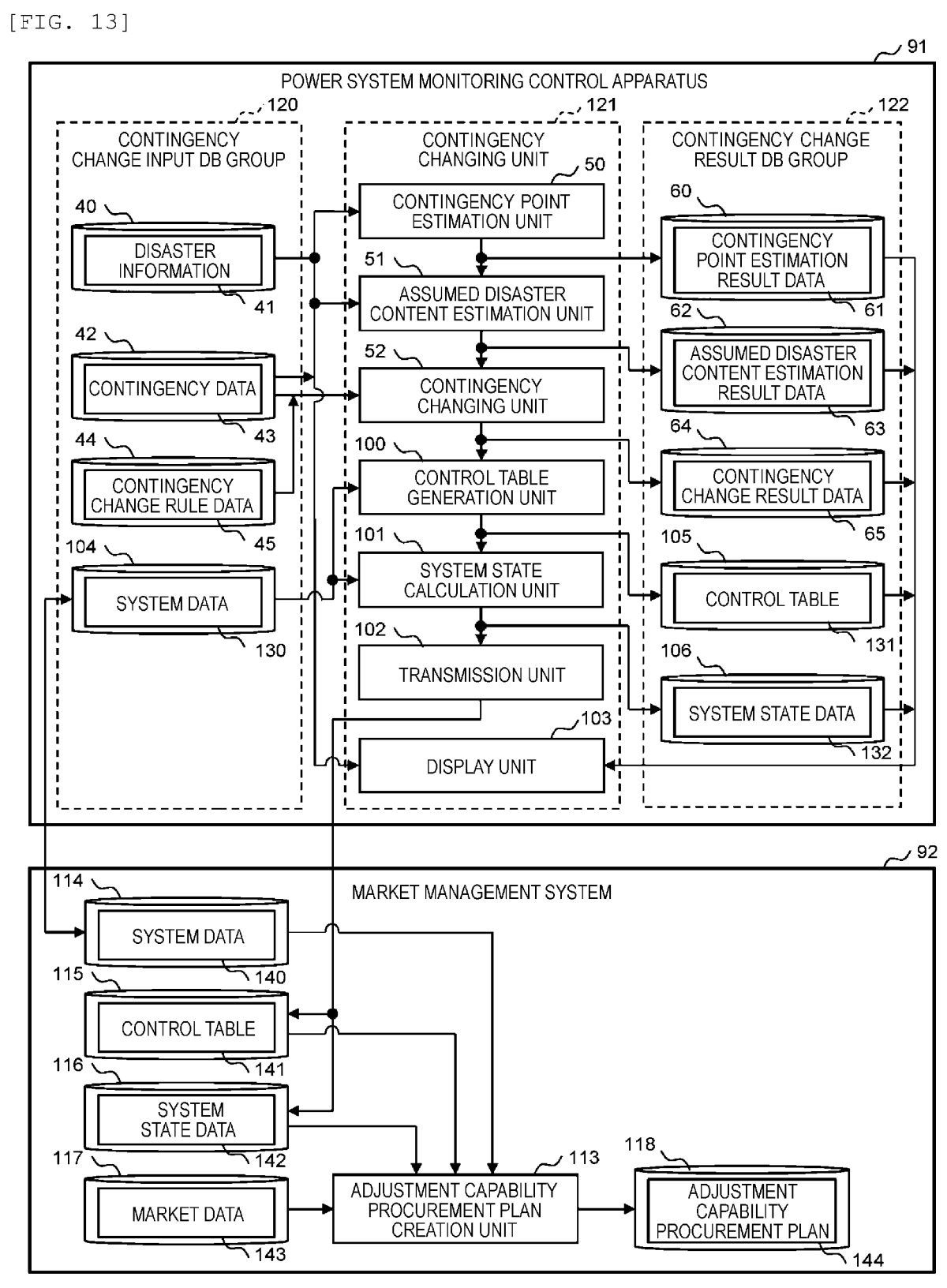

FIG. 13, in which components corresponding to those in FIG. 2 are denoted by the same reference numerals, illustrates logical configurations of the power system monitoring control apparatus 91 and the market management system 92 according to the present embodiment. As illustrated in FIG. 13, the power system monitoring control apparatus 91 is configured to include a contingency change input database group 120, a contingency changing unit 121, and a contingency change result database group 122.

The contingency change input database group 120 is configured with the disaster information database 40, the contingency database 42, the contingency change rule database 44, and the system data database 104. Since the disaster information database 40, the contingency database 42, and the contingency change rule database 44 are databases having the configurations and contents as described above with reference to FIGS. 3 to 5, the description thereof will be omitted herein.

In addition, since the system data database 104 is a database having the same configuration and contents as the system data database 72 (FIG. 2) of the first embodiment, the description thereof will be omitted herein. It is noted that the system data 130 stored in the system data database 104 is data having the same content as the system data 73 stored in the system data database 72 of the first embodiment.

The contingency changing unit 121 is configured with the contingency point estimation unit 50, the assumed disaster content estimation unit 51, the contingency changing unit 52, the control table generation unit 100, the system state calculation unit 101, the transmission unit 102, and the display unit 103. The contingency point estimation unit 50, the assumed disaster content estimation unit 51, and the contingency changing unit 52 are functional units having the respective functions described above.

The control table generation unit 100 is a functional unit that is realized by the CPU 20 (FIG. 12) of the power system monitoring control apparatus 91 executing the control table generation program 100P (FIG. 12) stored in the memory 21 (FIG. 12). The control table generation unit 100 generates the control table 131 for each time zone in the same manner as the control table generation unit 74 (FIG. 2) of the first embodiment based on the contingency change result data 65 for each time zone provided from the contingency changing unit 52 and the system data 130 stored in the system data database 104. Then, the control table generation unit 100 stores the generated control table 131 in the control table database 105 and outputs the generated control table 131 to the system state calculation unit 101.

It is noted that the control table 131 is a control table that is relaxed on the premise of using the system stabilization system. In addition, in the following description, the control table 131 is already stored in the control table database 105, and the control table generation unit 100 is assumed to generate a new updated control table 131 based on the contingency change result data 65 for each time zone provided from the contingency changing unit 52, to store the generated new control table 131 in the control table database 105 so as to overwrite the original control table 131, and to output the generated new control table 131 to the system state calculation unit 101.

The system state calculation unit 101 is a functional unit that is realized by the CPU 20 of the power system monitoring control apparatus 91 executing the system state calculation program 101P (FIG. 12) stored in the memory 21. The system state calculation unit 101 calculates the power for each time zone to be procured as the adjustment capability from the power trading market and the new operation standard for each transmission line at that time on the premise that the control of the corresponding control target registered in the updated control table 131 is executed during the occurrence of each contingency. Then, the system state calculation unit 101 stores the calculated power to be procured for each time zone and the operation standard as the system state data 132 for each time zone in the system state data database 106 and outputs the system state data 132 and the data of the control table 131 for each time zone provided from the control table generation unit 100 to the transmission unit 102.

The transmission unit 102 is a functional unit that is realized by the CPU 20 of the power system monitoring control apparatus 91 executing the transmission program 102P (FIG. 12) stored in the memory 21. The transmission unit 102 transmits the system state data 132 for each time zone provided from the system state calculation unit 101 and the data of the control table 131 for each time zone to the market management system 92 via the communication device 23 (FIG. 12).

The display unit 103 is a functional unit that is realized by the CPU 20 of the power system monitoring control apparatus 91 executing the display program 103P (FIG. 16) stored in the memory 21. The display unit 103 displays a predetermined screen including various information included in the contingency change result display screen 80 described above with reference to, for example FIG. 10 based on the contingency point estimation result data 61 for each time zone stored in the contingency point estimation result database 60 and the assumed disaster content estimation result data 63 for each time zone registered in the assumed disaster content estimation result database 62, the contingency change result data 65 for each time zone stored in contingency change result database 64, the control table 131 for each time zone stored in the control table database 105, and the system state data 132 for each time zone stored in the system state data database 106.

The contingency change result database group 122 is configured with the contingency point estimation result database 60, the assumed disaster content estimation result database 62, the contingency change result database 64, the control table database 105, and the system state data database 106.

Since each of the contingency point estimation result database 60, the assumed disaster content estimation result database 62, and the contingency change result database 64 has the configuration and contents as described above with reference to FIGS. 6 to 8, the description thereof will be omitted herein. Since the control table database 105 has the same configuration and contents as the control table database 76 (FIG. 9A) of the first embodiment, the description thereof will be omitted herein.

The system state data database 106 is a database used for managing the system state data 132 for each time zone calculated by the system state calculation unit 101 as described above.

As illustrated in FIG. 14, the system state data 132 includes information (hereinafter, referred to as adjustment capability procurement power information) 132A on power for each time zone to be procured as the adjustment capability from the power trading market calculated by the system state calculation unit 101 as described above and information (hereinafter, referred to as transmission line information) 132B on a new operation standard for each time zone of each transmission line.

The adjustment capability procurement power information 132A includes name information 132AA which is information on a name of a market product to be procured from the power trading market as adjustment capability in the corresponding time zone, procurement power information 132AB which is information on an amount of the market product to be procured, and unit price information 132AC which is information on a bid unit price of the corresponding market product. In addition, the transmission line information 132B includes transmission line name information 132BA which is information on a name of each transmission line and operation standard information 132BB which is information on a new relaxed operation standard for the transmission line.

On the other hand, as illustrated in FIG. 13, the market management system 92 includes the system data database 114, the control table database 115, the system state data database 116, the market data database 117, an adjustment capability procurement plan creation unit 113, and the adjustment capability procurement plan database 118.

The system data database 114 is a database having the same configuration as the system data database 104 of the power system monitoring control apparatus 91. The system data database 114 stores the same system data 140 as the system data 130 stored in the system data database 104, and when the system data 130 of the system data database 104 is updated, the system data 140 of the system data database 114 is similarly updated in synchronization with the updating.

The control table database 115 and the system state data database 116 also have the same configurations as the control table database 105 and the system state data database 106 of the power system monitoring control apparatus 91, respectively, and store the control table 141 and the system state data 142 transmitted from the power system monitoring control apparatus 91, respectively. In addition, the market data database 117 stores bid information for each market product for each time zone as market data 143.

The adjustment capability procurement plan creation unit 113 is a functional unit that is realized by the CPU 110 (FIG. 12) of the market management system 92 executing the adjustment capability procurement plan creation program 113P (FIG. 12) stored in the memory 111 (FIG. 2). The adjustment capability procurement plan creation unit 113 creates a power procurement plan (hereinafter, referred to as an adjustment capability procurement plan) 144 for each time zone to be procured from the power trading market as an adjustment capability based on system data 140 stored in the system data database 114, a control table 141 for each time zone stored in the control table database 115, system state data 142 for each time zone stored in the system state data database 116, and market data 143 stored in the market data database 117 and stores the created adjustment capability procurement plan 144 for each time zone in the adjustment capability procurement plan database 118.

The adjustment capability procurement plan database 118 is a database used for managing the adjustment capability procurement plan 144 for each time zone created by the adjustment capability procurement plan creation unit 113. The adjustment capability procurement plan 144 registered in the adjustment capability procurement plan database 118 is notified to the business operator (general power transmission and distribution business operator) who owns the power system monitoring control apparatus 91. Thus, such a business operator procures power as an adjustment capability from the power trading market for each time zone according to this adjustment capability procurement plan 144.

(2-2) Second Power System Monitoring Control Process

FIG. 15 illustrates a flow of a series of processes (hereinafter, referred to as second power system monitoring control processes) executed by the power system monitoring control apparatus 91 to generate or calculate the updated control table 131 for each time zone and the system state data 132 for each time zone as described above.

When the second power system monitoring control process illustrated in FIG. 15 is started in the power system monitoring control apparatus 91, steps S10 to S12 are executed in the same manner as steps S1 to S3 of the first power system monitoring control process described above with reference to FIG. 11 by the contingency point estimation unit 50, the assumed disaster content estimation unit 51, and the contingency changing unit 52.

Subsequently, the control table generation unit 100 generates a new control table 131 for each time zone based on the contingency change result data 65 for each time zone provided from the contingency changing unit 52 and the system data 130 stored in the system data database 104, stores the generated control table 131 in the control table database 105, and outputs the generated control table 131 to the system state calculation unit 101 (S13).

Next, the system state calculation unit 101 calculates the power for each time zone to be procured from the power trading market as adjustment capability and the new operational standard of each transmission line on the premise that the control of the corresponding control target registered in the new control table 131 is executed when each contingency occurs, based on the new control table 131 for each time zone provided from the control table generation unit 100 and the system data 130 stored in the system data database 104.

The "power for each time zone to be procured from the power market as an adjustment capability" can be calculated by using the amount of power procured from the power market as an objective function and using methods such as security constrained optimal power flow and security constrained economic dispatch which is an optimization calculation with system constraints during normal times and contingencies as constraints.

In addition, the system state calculation unit 101 stores the calculated power (procurement capacity) for each time zone and the new operation standard of each transmission line as the system state data 132 for each time zone in the system state data database 106 and outputs the system state data 132 for each time zone and the data of the control table 131 for each time zone provided from the control table generation unit 100 to the transmission unit 102 (S14).

After that, the transmission unit 102 outputs the system state data 132 for each time zone provided from the system state calculation unit 101 and the data of the control table 131 to the market management system 92 (S15), and the power system monitoring control process ends.

(2-3) Effects of the Present Embodiment

As described above, in the power system monitoring control system 90 of the present embodiment, since the market management system 92 calculates the procurement plan for the adjustment capability based on the new relaxed control table 131, the system stability can be maintained by the system stabilization system even during the occurrence of a failure due to a disaster, and an inexpensive adjustment capability can be procured by using the new relaxed control table 131, so that the operation cost of the power system operator can be reduced.

Actually, in system state data 132 described above with respect to FIG. 14, the operation standard information 132BB of the transmission line information 132B represents the relaxed operation standard calculated based on the relaxed control table and the procured power information 132AB of the adjustment capability procurement power information 132A represents the procured power that satisfies relaxed operation standard. For this reason, since the market management system 92 can calculate the procurement plan from an initial point with low procurement costs under relaxed conditions by using the operation standard of each transmission line and the procurement power of the market product as constraints and initial values and evaluating the system stability based on the new updated control table 131, more inexpensive adjustment capability can be procured.

(3) Third Embodiment

FIG. 16, in which components corresponding to those in FIG. 12 are denoted by the same reference numerals, illustrates a power system monitoring control system 150 according to the third embodiment. The power system monitoring control system 150 is configured to include a power system monitoring control apparatus 151 and a central power supply command system 152 which are connected via the network 2 and a system stabilization system (not illustrated).

Similarly to the second embodiment, the power system monitoring control apparatus 151 is a computer device having functions of updating the control table and calculating the state of the power system for each time zone based on the updated control table. The power system monitoring control apparatus 151 transmits the data of the updated control table for each time zone and data (hereinafter, referred to as system state data) representing the calculated state of the power system for each time zone to the central power supply command system 152.

The central power supply command system 152 is a system that has a function of formulating a supply/demand plan of a future power based on a past power demand, weather forecasts, or the like, adjusting the output of the generator according to the formulated supply/demand plan, and the like. In addition, the central power supply command system 152 of the present embodiment generates an adjustment capability triggering command for each time zone, for example, as to what degree of adjustment capability is triggered by using which generator based on the updated control table and the system state data for each time zone provided from the power system monitoring control apparatus 151 and triggers the required adjustment capability by adjusting the necessary output of the generator based on the generated adjustment capability triggering command.

Figure 17:
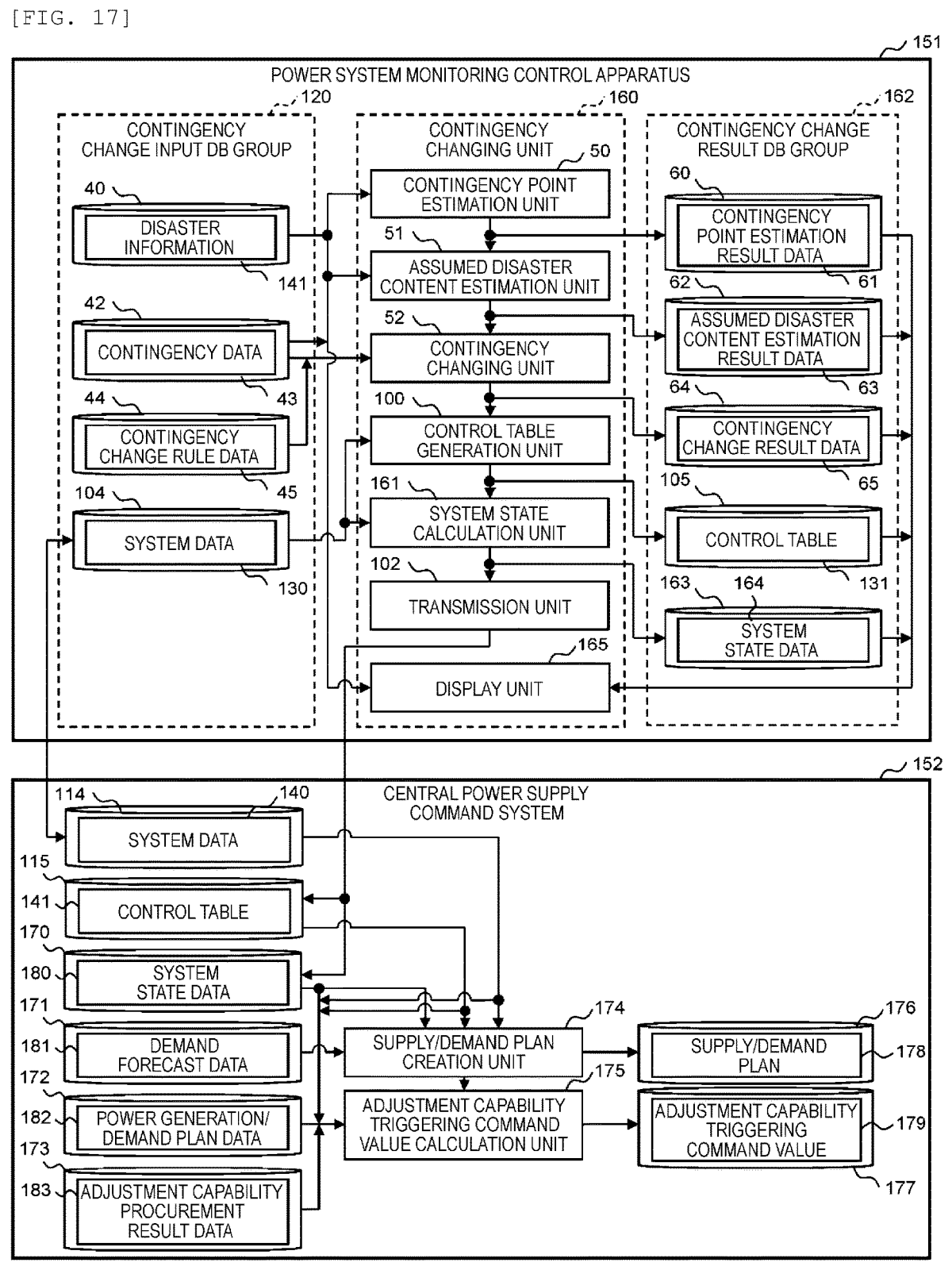

FIG. 17, in which components corresponding to those in FIG. 13 are denoted by the same reference numerals, illustrates logical configurations of the power system monitoring control apparatus 151 and the central power supply command system 152. As illustrated in FIG. 17, the power system monitoring control apparatus 151 has the same configuration as the power system monitoring control apparatus 91 (FIG. 13) of the second embodiment except for the contents of a system state calculation unit 161 of a contingency changing unit 160 and system state data 164 stored in a system state data database 163 of a contingency change result database group 162.

The system state calculation unit 161 is a functional unit that is realized by the CPU 20 (FIG. 16) of the power system monitoring control apparatus 151 executing a system state calculation program 161P (FIG. 16) stored in the memory 21 (FIG. 16). The system state calculation unit 161 calculates the generated power of each generator to be output as the adjustment capability for each time zone and the new operation standard of each transmission line for each time zone on the premise that the control of the corresponding control target registered in the updated control table 131 (FIG. 17) is executed during the occurrence of each contingency. Then, the system state calculation unit 161 stores the calculated six powers for each time zone and operation standard as the system state data 164 for each time zone in the system state data database 163 and outputs the system state data 164 for each time zone and the data of the control table 131 for each time zone provided from the control table generation unit 100 to the transmission unit 102. Thus, the data of the control table 131 for each time zone and the system state data 154 for each time zone are transmitted from the transmission unit 102 to the central power supply command system 152.

The display unit 165 is a functional unit that is realized by the CPU 20 of the power system monitoring control apparatus 151 executing a display program 165P (FIG. 16) stored in the memory 21. The display unit 165 displays a predetermined screen including various information included in the contingency change result display screen 80 described above with reference to, for example FIG. 10 based on the contingency point estimation result data 61 for each time zone stored in the contingency point estimation result database 60, the assumed disaster content estimation result data 63 for each time zone registered in the assumed disaster content estimation result database 62, the contingency change result data 65 for each time zone stored in contingency change result database 64, the control table 131 for each time zone stored in control table database 105, and the system state data 164 for each time zone stored in the system state data database 163.

It is noted that the configuration of the system state data 164 of the present embodiment is illustrated in FIG. 18. As illustrated in FIG. 18, the system state data 164 of the present embodiment includes information (hereinafter, referred to as generator information) 164A on the output power of each generator to be output as the adjustment capability for each time zone calculated by the system state calculation unit 161 and transmission line information 164B.

The generator information 164A includes name information 164AA which is information on the name of the generator of which output is to be controlled so as to generate the adjustment capability in the corresponding time zone, and output information 164AB which is to be output as the procurement power from the generator, and price information 164AC which is information on the fuel cost (fuel cost per unit power) required to output the power of 1 kWh from the corresponding generator. In addition, the transmission line information 164B includes transmission line name information 164BA which is information on the name of each transmission line, and operation standard information 164BB which is information on the new relaxed operation standard for the transmission line.

On the other hand, the central power supply command system 152 is configured to include a system data database 114, a control table database 115, a system state data database 170, a demand forecast data database 171, a power generation/demand plan data database 172, an adjustment capability procurement result data database 173, a supply/demand plan creation unit 174, an adjustment capability triggering command value calculation unit 175, a supply/demand plan database 176, and an adjustment capability triggering command value database 177.

The system data database 114 is a database having the same configuration as the system data database 104 of the power system monitoring control apparatus 151. The system data database 114 stores the same system data 140 as the system data 130 stored in the system data database 104, and when the system data 130 of the system data database 104 is updated, the system data 140 of the system data database 114 is also similarly updated in synchronization with the updating.

The control table database 115 and the system state data database 170 are also databases having the same configurations as the control table database 105 and the system state data database 163 of the power system monitoring control apparatus 151, respectively, and the control table 141 and system state data 180 transmitted from the power system monitoring control apparatus 151 are stored, respectively.

In addition, the demand forecast data database 171 stores demand forecast data 181 which is a power demand prediction result calculated in advance in each future time zone based on past performance and weather forecasts. Furthermore, the power generation/demand plan data database 172 stores a power generation plan and a demand plan for each future time zone submitted by a power generation company, a power retailer, a balancing group, a resource aggregator, or the like as power generation/demand plan data 182. In addition, the adjustment capability procurement result data database 173 stores adjustment capability procurement result data 183 representing the procurement result of the adjustment capability so far.

The supply/demand plan creation unit 174 is a functional unit that is realized by the CPU 110 (FIG. 16) of the central power supply command system 152 executing a supply/demand plan creation program 174P stored in the memory 111 (FIG. 16). The supply/demand plan creation unit 174 creates a supply/demand plan 178 that is a plan of demand and supply for each future time zone based on the system data 140 stored in the system data database 114, the control tables 141 for each time zone stored in the control table database 115, the system state data 180 for each time zone stored in the system state data database 170, and the demand forecast data 181 stored in the demand forecast data database 171, stores the created supply/demand plan 178 in the supply/demand plan database 176.

The adjustment capability triggering command value calculation unit 175 is a functional unit that is realized by the CPU 110 (FIG. 16) of the central power supply command system 152 executing an adjustment capability triggering command value calculation program 175P stored in the memory 111 (FIG. 16). The adjustment capability triggering command value calculation unit 175 calculates an adjustment capability command value (hereinafter, referred to as an adjustment capability triggering command value) 179 to be actually triggered for each future time zone based on the supply/demand plan 178 for each time zone created by the supply/demand plan creation unit 174, the power generation/demand plan data 182 stored in the power generation/demand plan data database 172, and the adjustment capability procurement result data 183 stored in the adjustment capability procurement result data database 173 and stores the calculated adjustment capability triggering command value 179 in the adjustment capability triggering command value database 177 for each time zone.

The supply/demand plan database 176 is a database used for managing the supply/demand plan for each time zone created by the supply/demand plan creation unit 174 as described above. After that, the supply/demand plan 178 stored in the supply/demand plan database 176 is used for controlling the output power of each generator.

The adjustment capability triggering command value database 177 is a database used for managing the adjustment capability triggering command value 179 for each future time zone calculated by the adjustment capability triggering command value calculation unit 175 as described above. In accordance with the adjustment capability triggering command value 179 stored in the adjustment capability triggering command value database 177, output control of the corresponding generator for triggering the adjustment capability for each future time zone is performed by the central power supply command system 152.

In the power system monitoring control system 150 of the present embodiment having the above configuration, the system stability can be maintained by the system stabilization system during the occurrence of a system failure due to a disaster so as to calculate the supply plan and the adjustment capability triggering command value for each generator based on the control table stored in the control table database of the power system monitoring control apparatus, and also, the supply plan can be formulated and the adjustment capability can be triggered by using more inexpensive generators, so that the operation costs can be reduced.

Actually, in the system state data 164 described above with respect to FIG. 18, the operation standard information 164BB for each transmission line represents the operation standard relaxed by the updated control table 131 (FIG. 17), and the output information 164AB of the generator information 164A represents the state of the generator that satisfies the operation standard relaxed by the updated control table 131. For this reason, the central power supply command system 152 (FIG. 16) sets the operation standard and the generator state as constraints and initial values and evaluates the system stability based on the relaxed control table 131, so that the supply/demand plan 178 (FIG. 17) and the adjustment capability triggering command value 179 (FIG. 17) can be calculated from the initial point with a low fuel cost under the relaxed constraints, and thus, the supply/demand plan can be formulated and the adjustment capability can be triggered by using more inexpensive generator.

(4) Other Embodiments

In the first to third embodiments described above, the case where the power system monitoring control apparatus 4 is allowed to be provided separately from the system stabilization system 3, the market management system 92, or the central power supply command system 152 has been described, but the present invention is not limited thereto. All the functions of the power system monitoring control apparatus 4 may be allowed to be installed in the system stabilization system 3, the market management system 92, or the power supply command system 152, and a portion of the functions of the power system monitoring control apparatus 4 may be allowed to be installed in the system stabilization system, the market management system 92, or a power supply command system 152. However, by providing the power system monitoring control apparatus 4 separately from the system stabilization system 3, the market management system 92, or the central power supply command system 152, it is possible to achieve the effects as objects of the present invention while using the existing system stabilization system 3, the existing market management system 92, or the existing central power supply command system 152 almost as it is.

In addition, in the first to third embodiments described above, the case where the disaster information 41 is allowed to include information on both the occurrence point and content of the disaster has been described, but the present invention is not limited thereto, and only one of the information of the occurrence point and content of the disaster may be allowed to be included.

Furthermore, in the first to third embodiments described above, the case where the contingency change rule is allowed to include information on both the disaster point and disaster content and information on the contingency change content has been described, but the present invention is not limited thereto, only one information on the disaster point and the disaster content may be allowed to include the information on the contingency change content.

Furthermore, in the second embodiment described above, the case where the adjustment capability procurement plan creation unit 113 of the market management system 92 is allowed to procure the adjustment capability only from the power trading market has been described, but the present invention is limited thereto, and in addition to procurement of adjustment capability from the power trading market, the adjustment capability may be allowed to be procured by controlling the output of the generator.

Similarly, in the third embodiment described above, the case where the adjustment capability triggering command value calculation unit 175 of the central power supply command system 152 is allowed to procure the adjustment capability by controlling the output of the generator has been described, but the present invention is not limited thereto, and in addition to the output control of the generator, the adjustment capability may be allowed to be procured from the power trading market.

INDUSTRIAL APPLICABILITY

The present invention can be widely applied to power system monitoring control systems of various configurations including system stabilization systems.

REFERENCE SIGNS LIST

1, 90, 150: power system monitoring control system
3: system stabilization system
4, 91, 151: power system monitoring control apparatus
10, 20: CPU
25: display device
30, 120: contingency change input database group
31, 121, 160: contingency changing unit
32, 122, 162: contingency change result database group
40: disaster information database
41: disaster information
42, 70: contingency database

43, 71: contingency data
44: contingency change rule database
45: contingency change rule data
50: contingency point estimation unit
51: assumed disaster content estimation unit
52: contingency changing unit
53: post-change contingency transmission unit
54, 103, 165: display unit
60: contingency point estimation result database
61: contingency point estimation result data
62: assumed disaster content estimation result database
63: assumed disaster content estimation result data
64: contingency change result database
65: contingency change result data
72, 104: system data database
73, 130: system data
74, 100: control table generation unit
75, 105, 115: control table database
76, 131, 141: control table
80: contingency change result display screen
92: market management system
101, 161: system state calculation unit
102: transmission unit
106, 116, 163, 170: system state data database
113: adjustment capability procurement plan creation unit
117: market data database
118: adjustment capability procurement plan database
132, 142, 164, 180: system state data
143: market data
144: adjustment capability procurement plan
152: central power supply command system, demand forecast data database
171: power generation/demand plan database
173: adjustment capability procurement data database
174: supply/demand planning unit
175: adjustment capability triggering command value calculation unit
176: supply/demand planning database
177: adjustment capability triggering command value database
178: supply/demand plan
179: adjustment capability triggering command value
181: demand forecast data
182: power generation/demand plan data
183: adjustment capability procurement result data

The invention claimed is:

1. A power system monitoring control system that retains a control table in which a control target to be controlled to maintain stability of a power system when a failure occurs for each type of the failure is registered and, when the failure occurs in the power system, controls the control target according to the type of the failure according to the control table, the power system monitoring control system comprising:

an contingency point estimator that estimates an contingency point which is an occurrence point of the failure that is assumed in the power system based on predetermined disaster information;

an assumed disaster content estimator that estimates, for each contingency point, an assumed disaster content which is a content of a disaster assumed to occur at the contingency point based on the disaster information and an estimation result of the contingency point estimator;

a contingency changer that changes contingency data based on an estimation result of the assumed disaster content estimator at each contingency point, the contingency data including an occurrence site and an aspect of each of the failures that are assumed to occur in the power system, and an contingency change rule including a contingency data change rule;

a control table generator that generates the control table based on the contingency data, wherein the control table generator updates the control table based on the contingency data changed by the contingency changer;

a system state calculator that calculates a system state of the power system based on the updated contingency data and system data required for power flow calculation, state estimation, and time series change calculation of the power system; and a transmitter that transmits at least one of the control table and the system state in a market management system that is installed in a power trading market and manages trading of a power product in the power trading market or in a central power supply command system that formulates a future power supply/demand plan based on past power demand and adjusts an output of a generator according to the supply/demand plan.

2. The power system monitoring control system according to claim 1, wherein control data are generated respectively for each of several time zones, wherein the disaster information and the contingency data for each time zone are prepared in advance, respectively, wherein the contingency point estimator and the assumed disaster content estimator estimate the contingency point or the assumed disaster content for each of the time zones, respectively, wherein the contingency changer changes each contingency data for each of the time zones, and wherein the control table generator updates each control table for each time zone based on post-change contingency data.

3. The power system monitoring control system according to claim 1, wherein the control table generator is provided in a system stabilization system that controls the control target according to the type of the failure according to the control table when the failure occurs in the power system, wherein the contingency point estimator, the assumed disaster content estimator, and the contingency changer are provided in a power system monitoring control apparatus that is provided separately from the system stabilization system, and wherein the power system monitoring control apparatus further includes a post-change contingency transmitter that transmits the contingency data changed by the contingency changer to the system stabilization system.

4. The power system monitoring control system according to claim 1, further comprising a display unit that displays the contingency change rule and the occurrence site and the aspect of the failure assumed in the power system based on post-change contingency data.

5. The power system monitoring control system according to claim 1, wherein the disaster information includes information on at least one of the occurrence point and the content of the disaster.

6. The power system monitoring control system according to claim 1, wherein the contingency change rule includes at least one of the occurrence point and the content of the disaster and a change content of the failure.

7. The power system monitoring control system according to claim 1, wherein system data required for power flow calculation, state estimation, and time series change calculation of the power system is retained in advance, and wherein the power system monitoring control system further comprises a system state calculator that calculates a relaxed system state of the power system based on the system data and updated contingency data.

8. The power system monitoring control system according to claim 7, wherein the system state of the power system includes at least one of power procured from a power trading market as an adjustment capability and a procurement unit price, power output from a generator as the adjustment capability and a fuel cost per unit power price, and a relaxed operation standard of a transmission line of the power system.

9. A power system monitoring control method executed by a power system monitoring control system that retains a control table in which a control target to be controlled to maintain stability of a power system when a failure occurs for each type of the failure is registered and, when the failure occurs in the power system, controls the control target according to the type of the failure according to the control table, the power system monitoring control method comprising:

estimating an contingency point which is an occurrence point of the failure that is assumed in the power system based on predetermined disaster information;

estimating, for each contingency point, an assumed disaster content which is a content of the disaster that is assumed to occur at the contingency point based on the disaster information and an estimation result of the contingency point;

changing the contingency data based on an estimation result of the assumed disaster content at each contingency point, contingency data including an occurrence site and an aspect of each of the failures assumed to occur in the power system, and an contingency change rule including an contingency data change rule;

updating the control table based on changed contingency data;

calculating a relaxed system state of the power system based on system data required for power flow calculation, state estimation, and time series change calculation of the power system and updated contingency data; and transmitting at least one of the updated control table and the system state in a market management system that is installed in a power trading market and manages trading of a power product in the power trading market or in a central power supply command system that formulates a future power supply/demand plan based on past power demand and adjusts an output of a generator according to the supply/demand plan.

10. The power system monitoring control method according to claim 9, wherein control data is generated for each of several time zones, wherein the disaster information and the contingency data for each time zone are prepared in advance, respectively, wherein in the estimating of the contingency point and the estimating of the assumed disaster content, the contingency point or the assumed disaster content for each of the time zones is estimated, wherein in the changing of the contingency data, the contingency data for each time zone is changed, and wherein in the updating of the control table, the control table for each time zone is updated based on post-change contingency data.

11. The power system monitoring control method according to claim 9, wherein the power system monitoring control system includes:

a system stabilization system that controls the control target according to the type of the failure according to the control table when the failure occurs in the power system; and a power system monitoring control apparatus that is provided separately from the system stabilization system, wherein the estimating of the contingency point, the estimating of the assumed disaster content, and the changing of the contingency data are executed by the power system monitoring control apparatus, and wherein the updating of the control table is executed by the system stabilization system.

12. The power system monitoring control method according to claim 9, further comprising displaying the contingency change rule and the occurrence site and the aspect of the failure that is assumed in the power system based on post-change contingency data.

13. The power system monitoring control method according to claim 9, wherein the disaster information includes information on at least one of the occurrence point and the content of the disaster.

14. The power system monitoring control method according to claim 9, wherein the contingency change rule includes at least one of the occurrence point and the content of the disaster, and a change content of the failure.

15. The power system monitoring control method according to claim 9, wherein the power system monitoring control system retains in advance system data required for power flow calculation, state estimation, and time series change calculation of the power system, and wherein the power system monitoring control method further comprises calculating a relaxed system state of the power system based on the system data and updated contingency data.

16. The power system monitoring control method according to claim 15, wherein the system state of the power system includes at least one of power procured from a power trading market as an adjustment capability and a procurement unit price, power output from a generator as the adjustment capability and a fuel cost per unit power price, and a relaxed operation standard of a transmission line of the power system.

\* \* \* \* \*